United States Patent [19]
Struble

[11] Patent Number: 6,073,360
[45] Date of Patent: Jun. 13, 2000

[54] INSTRUMENT MOUNT WITH SPRING-LOADED CLAMP

[75] Inventor: James E. Struble, Eaton Rapids, Mich.

[73] Assignee: JS Research and Development, Inc., Eaton Rapids, Mich.

[21] Appl. No.: 09/012,080

[22] Filed: Jan. 22, 1998

Related U.S. Application Data

[60] Provisional application No. 60/036,369, Jan. 22, 1997.

[51] Int. Cl.[7] .................................................. G01B 5/00
[52] U.S. Cl. .......................... 33/783; 33/794; 33/793; 33/800; 33/812
[58] Field of Search ..................... 33/783, 784, 792–796, 33/542, 533, 600, 613, 802, 812

[56] References Cited

U.S. PATENT DOCUMENTS

| | | | |
|---|---|---|---|
| 4,063,362 | 12/1977 | Amsbury et al. | 33/793 |
| 4,238,885 | 12/1980 | Lendi et al. | 33/784 |
| 4,477,978 | 10/1984 | Azuma | 33/600 |
| 4,566,199 | 1/1986 | Gruhler et al. | 33/784 |
| 4,700,485 | 10/1987 | Caulfield | 33/784 |
| 4,779,350 | 10/1988 | Renner | 33/792 |
| 4,831,742 | 5/1989 | Struble | 33/561 |
| 4,993,170 | 2/1991 | Burk | 33/793 |
| 5,239,763 | 8/1993 | Kulp | 33/812 |
| 5,293,695 | 3/1994 | Olshefsky | 33/783 |
| 5,574,381 | 11/1996 | Andermo et al. | 33/705 |

FOREIGN PATENT DOCUMENTS

| | | | |
|---|---|---|---|
| 279102 | 11/1988 | Japan | 33/783 |
| 107701 | 5/1991 | Japan | 33/792 |

OTHER PUBLICATIONS

235 Door Seal Gap Gage Brochure, p. 5, LMI Corporation (1996)(the month is unknown).

*Primary Examiner*—Christopher W. Fulton
*Assistant Examiner*—Quyen Doan
*Attorney, Agent, or Firm*—MacMillan, Sobanski & Todd, LLC

[57] ABSTRACT

A mount for mounting a measuring instrument, such as an electronic measuring transducer. The mount includes a spring operated clamp assembly for attaching the mount to a first part with a reference surface engaging a desired location on the first part. In one embodiment, the clamp assembly grips the first part between a clamp member and a clamp portion. The mount has an unclamping member which may be operated with one hand to selectively open the clamp. In another embodiment, the clamp assembly includes a first clamp member and a second clamp member urged by a spring relatively away from the first clamp member, each of the first and second clamp members having a grip by which the first and second clamp members may be urged together then selectively released to clamp the mount in a gap between the first part and a second part.

20 Claims, 10 Drawing Sheets

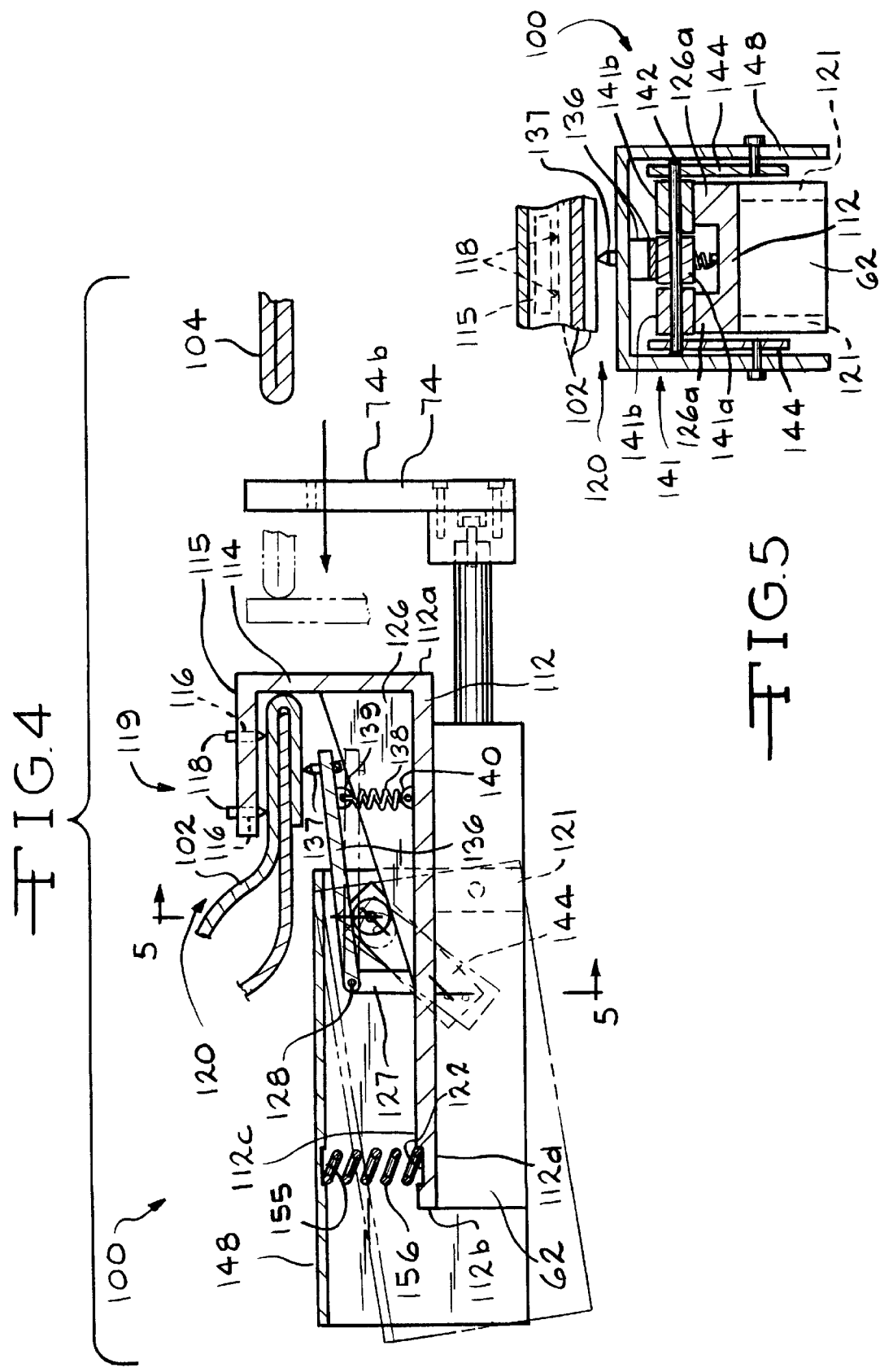

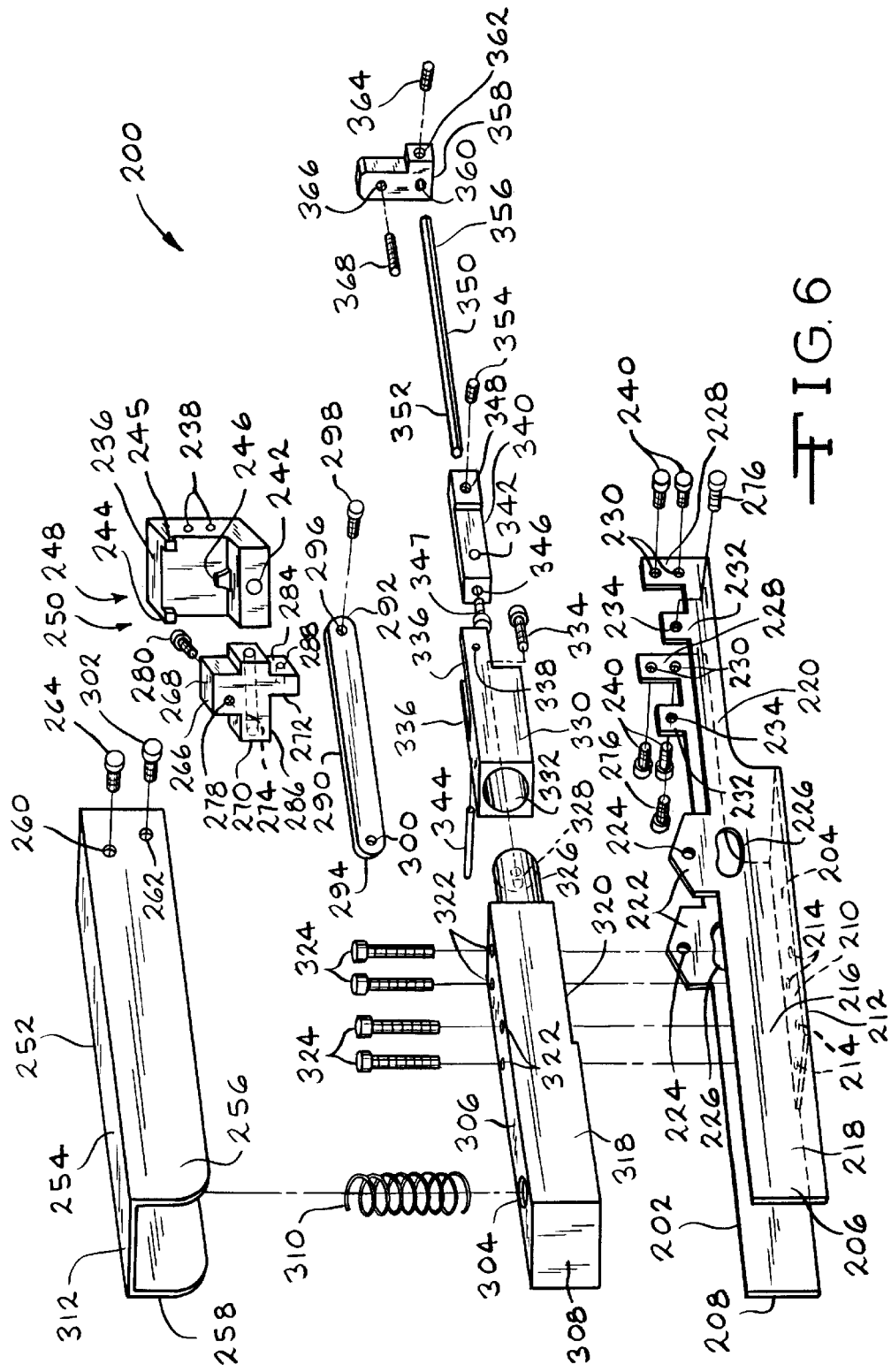

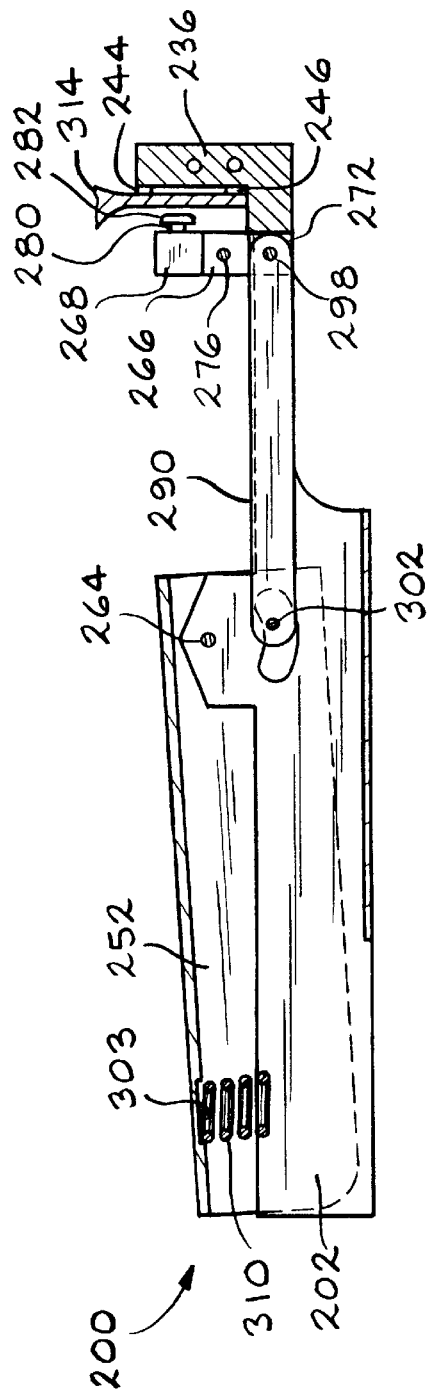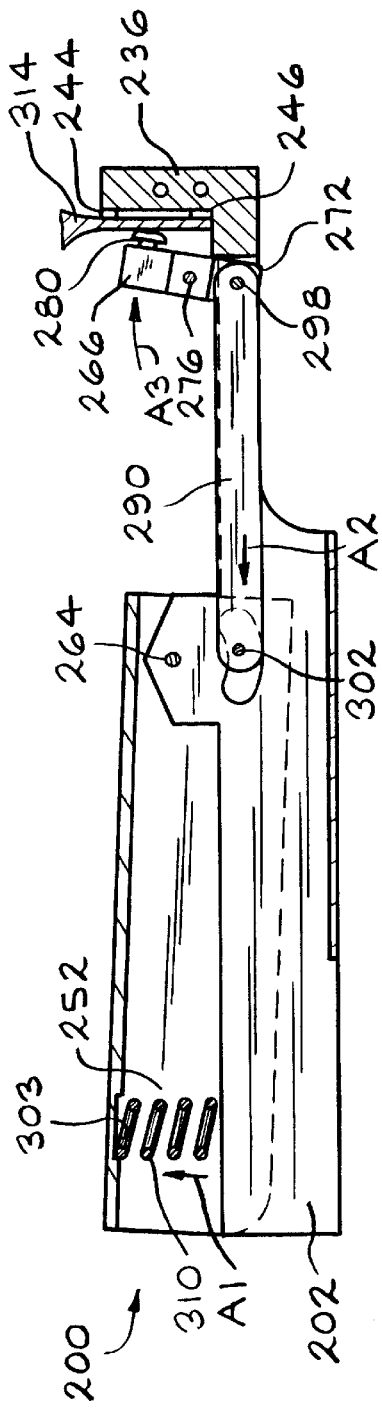

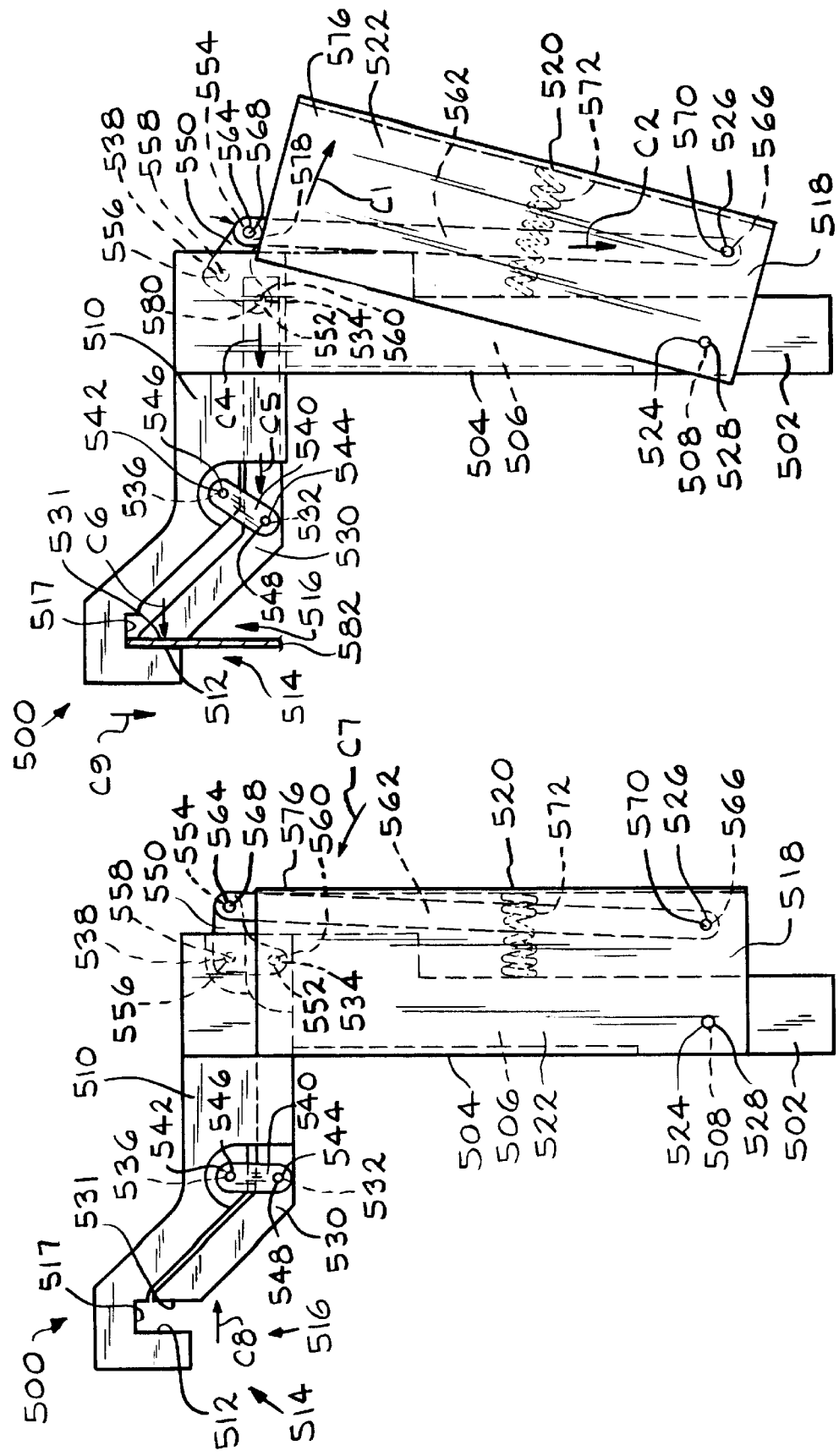

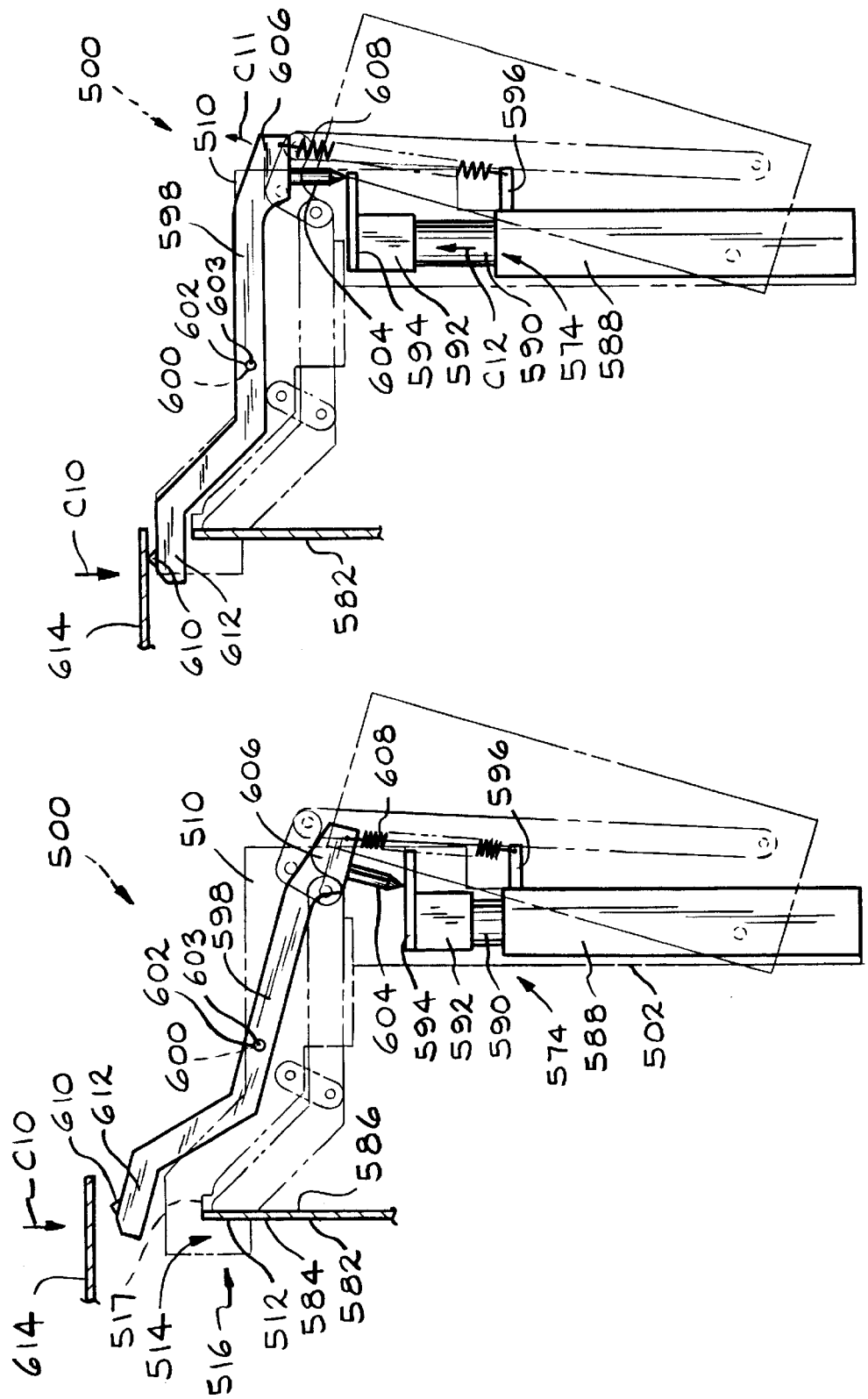

INSTRUMENT MOUNT WITH SPRING-LOADED CLAMP

CROSS REFERENCE TO RELATED APPLICATIONS

This application claims the benefit of U.S. Provisional Application No. 60/036,369, filed Jan. 22, 1997.

BACKGROUND OF THE INVENTION

The invention relates to a mount for a measuring device, and in particular to a mount having a spring-loaded clamp for releasably attaching the mount to a flange.

In the manufacture of automobiles, as with many devices, it is important that the components thereof are properly aligned with one another for proper function. For example, the doors of a vehicle should be properly aligned with the body of the vehicle. An elastomeric door seal is fixed to the body of the vehicle about the door opening therein. The door seal is fixed to a door seal flange which extends inwardly into the door opening. The door presses against the door seal so that the door seal provides a leak-tight seal between the door and the body to keep wind and rain out of the passenger compartment of the vehicle. In order for the door seal to work, the door must be properly positioned relative to the door seal flange. The door must be close enough to the door seal flange to fully engage the door seal when the door is closed in order to provide a seal therewith. However, the door must not be positioned so close to the door seal flange that the door seal prevents the door from fully closing.

Thus, after the door is assembled to the body of the vehicle, it would be desirable to check for proper spacing between the door and the door seal flange. In a modem vehicle assembly plant, such measurements should be done expeditiously, so as not to slow production. One method which has been used in the past includes placing lumps of clay on the door seal flange to be compressed by the door when the door is shut. A measurement is taken of the thickness of the clay after the door is reopened. This measurement is difficult to do with accuracy and repeatability, and thus tends to be a relatively slow process.

Another method used in the past is to mount a metal housing to the door seal flange with a screw clamp such that a reference surface contacts the door seal flange. An arm is pivotally mounted on the housing in such a way that the arm experiences a fair amount of friction as it pivots, which tends to hold the arm in place. The arm is set up in a first position relative to the reference surface, and is moved to a second position by the door as it closes. After the door is re-opened, a probe transducer is fitted to the body to measure the distance between the second position of the arm and the reference surface. A device of this type is the 235 Door Seal Gap Gage, 234 Probe Adapter, and 200-SB probe transducer sold by LMI Corporation of Byron, Mich. A problem with this device is that the amount of friction between the pivoting arm and the housing is critical to the accuracy of the measurement. If the amount of friction is too high, the arm may hold the door further open than the closed position the door would move to without the resistance of the arm, thus causing an inaccurate reading. If the amount of friction is too low, the probe transducer may cause the arm to move when pressed against the arm. This problem is made worse by the fact that the amount of friction tends to change significantly as the device wears during use. Also, it is noted that installing this device is a two handed operation: one hand is needed to position the housing, and the other hand is needed to operate the screw clamp to clamp and unclamp the housing from the door seal flange.

Other known methods include measuring the gap between the door seal flange and the door with feeler gauges or calipers after the door is closed. These methods are unreliable due to the difficulty in accessing the space between the door seal flange and the door when the door is shut, and the degree of skill needed to obtain accurate, repeatable readings with such measuring instruments under such conditions.

Thus, it would be desirable to provide a mount for a measuring instrument that may be quickly and easily mounted on and removed from a part to be measured. It would also be desirable to provide a mount for a measuring instrument that ensures accurate measurements when the mount is moved to different locations on the part. It would further be desirable to provide a mount for a measuring instrument that provides flexibility in measuring differently oriented parts, and that provides a means to measure a part when the part is obstructed by another structure.

SUMMARY OF THE INVENTION

This invention relates to a mount for mounting a measuring instrument, such as an electronic measuring transducer. The mount includes a strongback to which the measuring instrument may be fixed. The mount has a reference surface. The mount further includes a clamp assembly for attaching the mount to a first part with the reference surface engaging a desired location on the first part. In one embodiment of the invention, the clamp assembly includes a clamp portion and a clamp member which moves relative to the clamp portion. The clamp member cooperates with the clamp portion to clamp the first part therebetween. The mount also includes force means for urging the clamp member to move relatively toward the clamp portion. The mount further includes an unclamping member which may be operated to selectively urge the clamp member to move relatively away from the clamp portion in opposition to the force means. The mount may be clamped to the first part to hold the measuring instrument in a path of movement of a second part whereby the measuring instrument can measure the distance between the second part and the location of the first part in contact with the reference surface of the clamp. In another embodiment of the invention, the mount includes a strongback adapted to have a measuring instrument fixed thereto, the strongback including a reference surface and a first clamp portion. The mount also includes a clamp member which is movably attached to the strongback, the clamp member including a second clamp portion. The first clamp portion and the second clamp portion define a clamp assembly. The mount further includes force means for urging the clamp member away from the strongback. The strongback and clamp member are squeezable together in opposition to the force means to compress the clamp assembly for placement between first and second parts. The strongback and clamp member are releasable to allow the force means to urge open the clamp assembly for clamping between the first and second parts.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is a side elevational view of a second embodiment of a mount according to the invention, in section, with a measuring instrument mounted thereon, and showing the clamp of the mount opened to engage a part.

FIG. 5 is a sectional view taken along line 5—5 of FIG. 4.

FIG. 6 is an exploded perspective view of a third embodiment of a mount according to the invention.

FIG. 7 is a side elevational view, partly in section, of the mount of FIG. 6, showing the clamp being held open for engaging a part.

FIG. 8 is a view similar to FIG. 7, except showing the clamp released to engage the part.

FIG. 12 is a side elevational view, partly in section, of a fifth embodiment of a mount according to the invention, showing a clamp being held open for engaging a part.

FIG. 13 is a view similar to FIG. 12, except showing the clamp released to engage the part.

FIG. 14 is a view similar to FIG. 13, except showing the mount in phantom, and showing a side elevational view of a measuring instrument mounted thereon.

FIG. 15 is a view similar to FIG. 14, except showing a measuring tip of the measuring instrument engaged by a second part.

DETAILED DESCRIPTION OF THE PREFERRED EMBODIMENT

Figure 1:
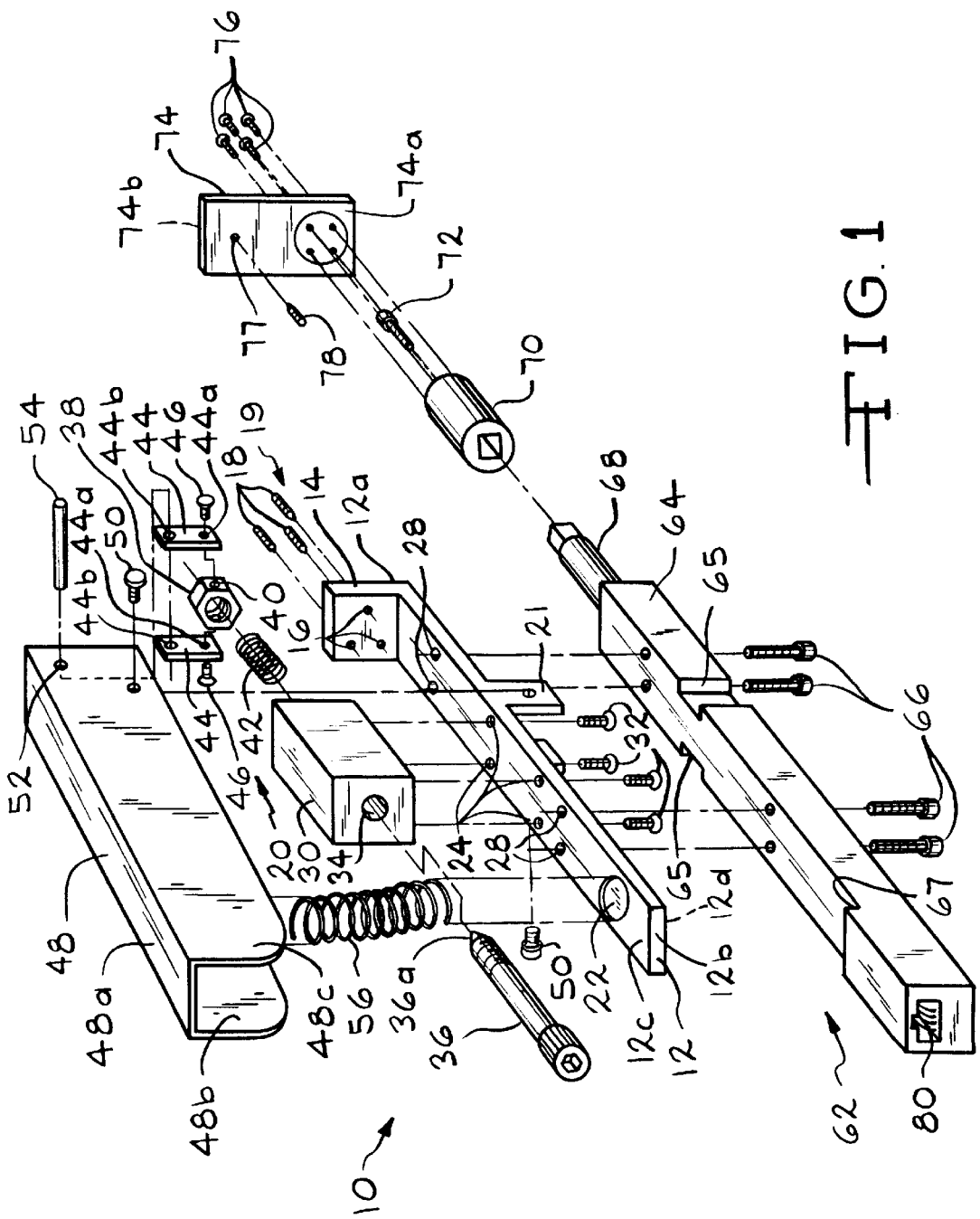
FIG. 1 is an exploded perspective view of a mount according to the invention.

In the following description of the invention, certain terminology will be used for the purpose of reference only, and is not intended to be limiting for the orientation in which the invention is claimed. Terms such as "upper", "lower", "above", "below", "rightward", "leftward", "clockwise" and "counterclockwise" refer to directions in the drawings to which reference is made. Terms such as "inward" and "outward" refer to directions toward and away from, respectively, the geometric center of the component described. The term "longitudinally" refers to directions generally parallel to the lengthwise axis which may be defined by the main portion of the invention, unless it is made clear that another axis is meant. Similarly, the term "transversely" refers to directions generally perpendicular to the lengthwise axis which may be defined by the main portion of the invention, unless it is made clear that another axis is meant. Such terminology will include the words specifically mentioned above, derivatives thereof, and words of similar import.

When referring to a first part being "pivotally mounted" to a second part in the following description, it should be understood that the parts are joined by any means that will alow the parts to pivot relative to one another. Nonlimiting examples of suitable means of pivotally mounting parts is by the use of shoulder screws, screws having an unthreaded portion, fasteners with spacers, a pin such as a roll pin, or any other means creating bearingable pivot points. When the following description refers to specific means of pivotally mounting a first part to a second part, it should be understood that any other suitable means can be used.

Referring now to the drawings, there is illustrated in FIG. 1 a mount of the present invention, indicated generally at 10. The mount includes a strongback 12. The strongback 12 is an elongated, generally flat member, preferably formed from a stiff metal. The strongback 12 has a first end 12a and a second end 12b. The flat strongback 12 defines a first face 12c and a second face 12d which faces the opposite direction from the first face 12c.

A flange extends perpendicularly from the first face 12c of the strongback 12 adjacent the first end 12a to form a first jaw 14. Preferably, three threaded bores 16 are formed perpendicularly through the first jaw 14. The bores 16 are spaced apart and form respective apexes of a triangular region defined thereby on each face of the first jaw 14. A corresponding threaded screw 18 is threaded through each of the bores 16. The screws 18 each preferably have a sharpened point which extends out of the first jaw 14 generally toward the second end 12b of the strongback 12. The protruding points of the three screws 18 define a plane, and the screws 18 in combination form a reference surface of the mount 10, the purpose of which will be explained below. As will be explained below, the first jaw 14 and the screws 18 cooperate to form a clamp portion, indicated generally at 19, of a clamp assembly, indicated generally at 20. The clamp portion 19 is fixed to the strongback 12. The screws 18 may be adjusted inwardly or outwardly relative to the first jaw 14 for the purposes of calibrating a measuring instrument to be fixed to the mount 10, or to ensure that a plane defined by the points of the screws 18 is perpendicular to the longitudinal axis of the strongback 12. However, the screws 18 will not normally be moved.

The strongback 12 further has a pair of laterally spaced apart locating arms 21 (only one can be seen from the perspective of FIG. 1). Each locating arm 21 extends perpendicularly from the second face 12d of the strongback 12 at a location between the first end 12a and the second end 12b of the strongback 12. The purpose of the locating arms 21 will be explained below.

A cylindrical recess 22 is formed in the first face 12c of the strongback 12, near the second end 12b of the strongback 12. The purpose of the recess 22 will be explained below.

Four unthreaded bores 24 are formed through the strongback 12 at a location near the locating arms 21. Each of the bores 24 is countersunk in the face 12d of the strongback 12 for a reason to be explained below.

Four threaded bores 28 are formed through the strongback 12. A first pair of the bores 28 are laterally spaced apart at a location between the bores 24 and the first end 12a of the strongback 12. A second pair of the bores 28 are laterally spaced apart at a location between the bores 24 and the second end 12b of the strongback 12.

In addition to the clamp portion 19 described above, the clamp assembly 20 of the mount 10 further includes a clamp body 30. The clamp body 30 is fixed to the strongback 12 by four screws 32 which extend through the unthreaded bores 24 in the strongback 12 and are threaded into corresponding threaded recesses in the clamp body 30. The head of each screw 32 is disposed in the countersunk portion of the bores 24, so that the screws 32 do not extend above the surface of the second face 12d of the strongback 12.

The clamp body 30 has a longitudinally extending smooth bore 34 defined therethrough. The axis of the bore 34 is parallel to the longitudinal axis of the strongback 12, and is aligned with a central part of the triangular region defined by the bores 16 through the first jaw 14.

The clamp 20 further includes a clamp member 36 which moves relative to the clamp portion 19, and is slidingly disposed in the bore 34 in the clamp body 30. The clamp member 36 is an elongated member, having a pointed longitudinal end 36a, which is held in alignment with the central part of the triangular region defined by the bores 16 through the first jaw 14 by the bore 34 in the clamp body 30. The portion of the clamp member 36 which can move in the bore 34 is unthreaded, so as to minimize wear and friction between the clamp member 36 and the clamp body 30. Only the longitudinal end 36a, which remains outside the clamp body 30, has a threaded exterior surface.

A nut 38 is threaded onto the clamp member 36 between the portion of the clamp member 36 disposed in the bore 34 of the clamp body 30 and the end 36a of the clamp member 36. The nut 38 has a pair of diametrically opposed, oppositely facing recesses 40 formed in the outer surface thereof (only one of which can be seen in FIG. 1). The recesses 40 are threaded. The purpose of the recesses 40 will be explained below.

A spring 42 is disposed about the clamp member 36 and engages the clamp body 30 and the nut 38. The spring 42 acts to urge the nut 38 and the clamp member 36 onto which the nut 38 is threaded toward the clamp portion 19 defined by the first jaw 14 and the screws 18.

A pair of links 44 are pivotally attached to the nut 38. Each of the links 44 has a pair of unthreaded bores 44a and 44b formed therethrough. The bore 44a of each of the links 44 is formed near one end of the link 44, while the bore 44b is formed near the other end of the link 44. A pair of shoulder screws 46 is provided, with each of the shoulder screws 46 extending through the bore 44a in a respective one of the links 44 to engage a respective one of the threaded recesses 40 in the nut 38, thereby pivotally attaching the respective link 44 to the nut 38. The pair of links 44 are attached to an unclamping arm or member 48 in a manner which will be described below.

The unclamping member 48 is an elongated member having a central portion 48a and a pair of laterally spaced apart side flanges 48b and 48c. The side flanges 48b and 48c cooperate with the central portion 48a to give the unclamping member 48 a generally "U-shaped" transverse cross section.

The unclamping member 48 is pivotally mounted to the locating arms 21 of the strongback 12 by a pair of shoulder screws 50. One of the shoulder screws 50 passes through an associated unthreaded bore through the side flange 48b and engages a threaded recess or threaded bore in a respective locating arm 21. The other of the shoulder screws 50 passes through an associated unthreaded bore through the side flange 48c and engages a threaded recess or threaded bore in the other locating arm 21. The shoulder screws 50 are co-linear, and cooperate to define an axis of rotation for the unclamping member 48.

The side flanges 48b and 48c each have a respective additional unthreaded bore 52 therethrough (only one of which can be seen in FIG. 1), with the bores 52 being transversely opposite one another. A roll pin 54 is press fit in the bores 52, and also extends through the bores 44b of the links 44 to pivotally attach the links 44 to the unclamping member 48.

The central portion 48a of the unclamping member 48 has a cylindrical recess 55 (shown in FIGS. 2 and 3) formed in the face thereof which faces the strongback 12.

A helically coiled clamping spring 56 has a first end thereof seated in the recess 55 formed in the unclamping member 48 and a second end thereof seated in the recess 22 formed in the strongback 12. The clamping spring 56 urges the end of the unclamping member 48 closest to the second end 12b of the strongback 12 to move relatively away from the strongback 12. Thus the clamping spring 56 urges the unclamping member 48 to pivot clockwise (as viewed from the perspective of FIGS. 2 and 3) about the axis of rotation defined by the shoulder screws 50. This causes a force to be transmitted from the unclamping member 48, through the links 44 and the nut 38, to the clamp member 36 which urges the clamp member 36 to move toward the clamp portion 19 defined by the first jaw 14 and the screws 18. Thus the clamping spring 56 works in conjunction with the spring 42 to urge the clamp assembly 20 to a closed or clamped condition (shown in FIG. 3) in which the clamp member 36 is moved as close as possible to the first jaw 14.

The clamping spring 56 may exert more force or less force on the clamp member 36 than the spring 42, and it is contemplated that in some embodiments of the invention a single spring may be provided to urge the clamp member 36 toward the clamp portion 19 fixed to the strongback 12. It will be appreciated that the clamping spring 56 and the spring 42 are embodiments of a means for urging the clamp member 36 to move relatively toward the clamp portion 19 of the clamp assembly 20.

Figure 2:
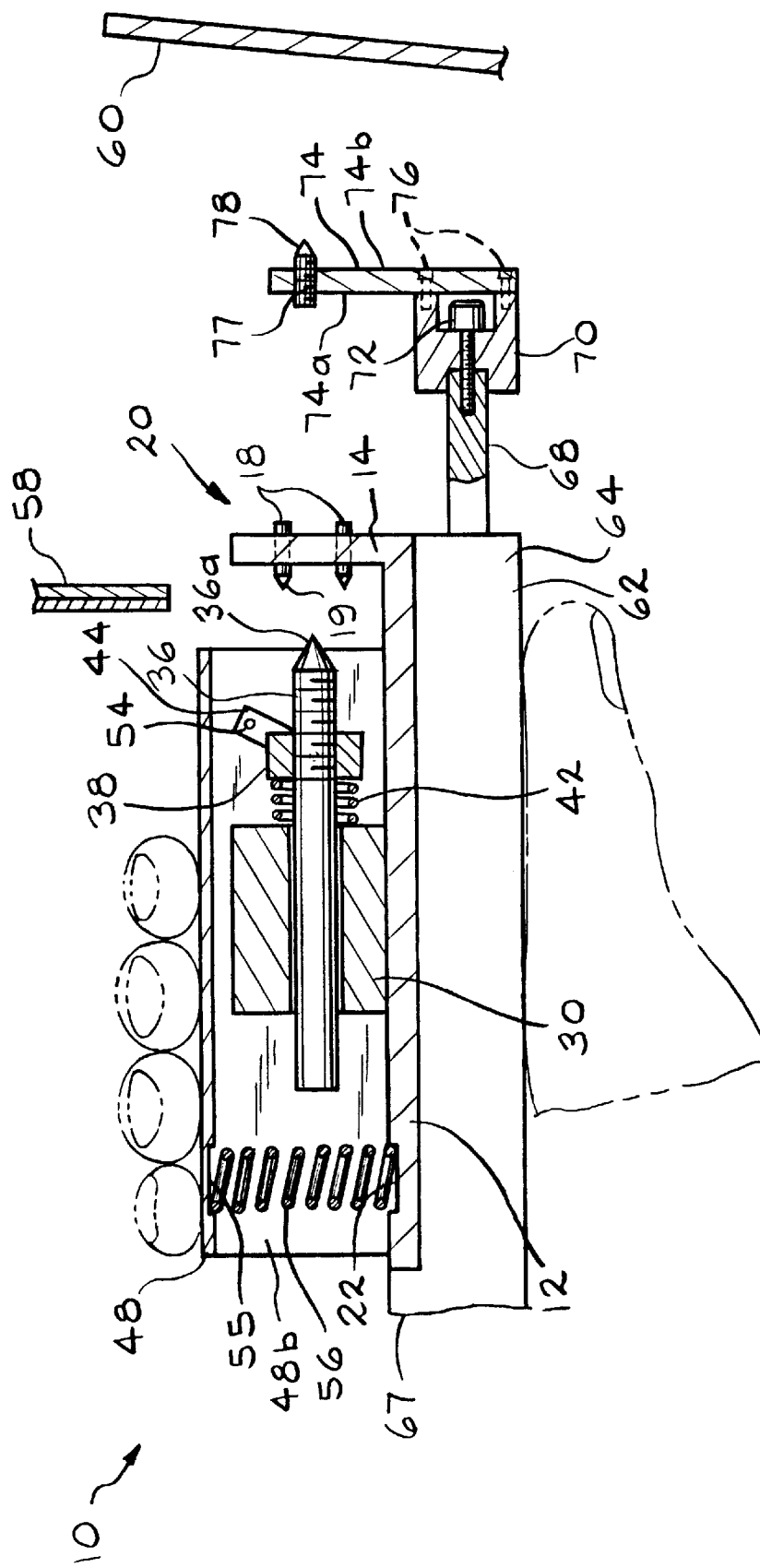
FIG. 2 is a side elevational view, partly in section, of the mount of FIG. 1, showing the clamp being held open for engaging a part.

As shown in FIG. 2, the unclamping member 48 may be squeezed with one hand of the user (shown in phantom) to compress the clamping spring 56 and apply a force acting through the links 44 which urges the clamp member 36 to move relatively away from the clamp portion 19, compressing the spring 42 and opening the clamp assembly 20. With the clamp assembly 20 in this open, or unclamped, condition, the mount 10 may be moved to engage a part, such as a door seal flange 58, with the reference surface defined by the three screws 18 in contact with the flange 58 at a desired location on the outside face of the flange 58 (the face closest to another part, the position of which will be measured relative to the flange 58, such as an associated vehicle door 60).

Figure 3:
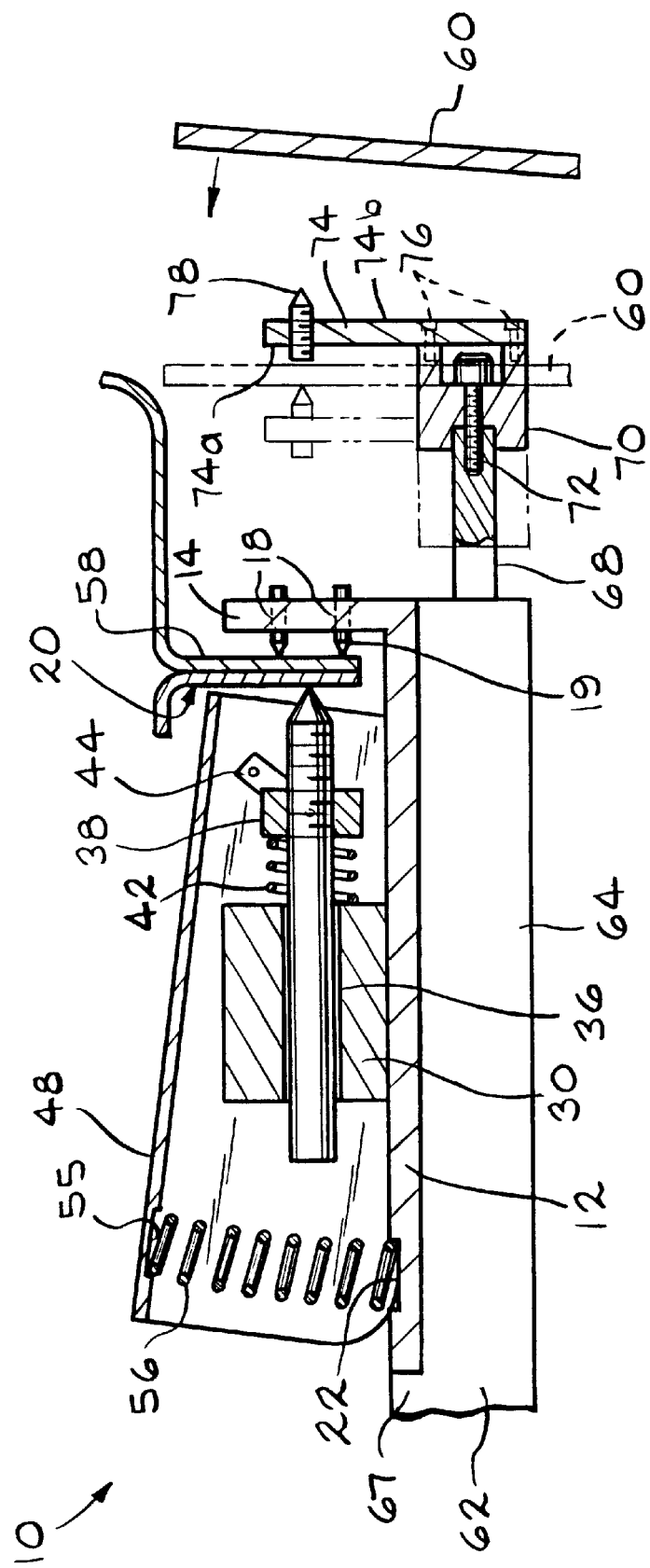
FIG. 3 is a view similar to FIG. 2, except showing the clamp released to engage the part.

As shown in FIG. 3, the unclamping member 48 may then be released by the user, allowing the clamping spring 56 and the spring 42 to urge the clamp member 36 to contact the inside face of the flange 58, opposite the clamp portion 19. The clamp assembly 20 squeezes the flange 58, causing the three screws 18 of the clamp portion 19 to firmly contact the flange 58. The use of three screws 18 ensures that the clamp assembly 20 will be stable relative to the flange 58, thereby holding the mount 10 in a stable, fixed relationship with the flange 58, with the reference surface of the strongback 12 (defined by the points of the screws 18) in contact with the flange 58.

If, upon inspection of the mount 10 fixed to the flange 58, the user decides that the mount 10 should be repositioned, the user can, with one hand, compress the unclamping member 48 toward the strongback 12, opening the clamp assembly 20, and permitting the mount 10 to be moved to a new location. The unclamping member 48 can then be released to allow the mount 10 to be clamped in the new location. In contrast, mounts using a screw clamp would require the use of two hands to release the mounts: one hand to hold the body of the clamp, and a second hand to unscrew the moving portion of the clamp. Similarly, mounts which might be used having a locking toggle action, similar to the action of the popular VICE GRIP brand locking pliers, would also require the use of two hands: one hand for grasping each toggle lever while the levers are forced apart.

A measuring instrument 62 which may be used with the mount 10 is illustrated in FIGS. 1 through 3. The measuring instrument 62 includes an electronic transducer 64. The transducer 64 has a pair of transversely spaced apart locating notches 65 which fit onto the locating arms 21 of the strongback 12 to fix the axial position of the measuring instrument 62 relative to the reference surface of the strongback 12 (defined by the three screws 18). The measuring instrument 62 is further fixed to the strongback 12 by four threaded members 66, each of which extends through the transducer 64 and engages an associated one of the threaded bores 28 in the strongback 12. Finally, the transducer 64 will preferably have an upwardly (as viewed in FIG. 1) extending portion 67 adjacent the second end 12b of the strongback 12, which helps to further firmly fix the position of the measuring instrument 62 relative to the mount 10.

It will be appreciated that a purpose of the strongback 12 is to support the clamp assembly 20 and the measuring instrument 62 rigidly with respect to the reference surface formed on the strongback 12, so that clamping and unclamping the clamp assembly does not materially disturb the fixed relationship between the measuring instrument 62 and the reference surface.

The measuring instrument 62 further includes a probe shaft 68 which is extensible relative to the transducer 64 on a path which is perpendicular to the plane defined by the points of the screws 18, which is the reference surface of the strongback 12. The transducer 64 monitors the movement of the probe shaft 68 to develop an electrical signal representative of the relative position of the probe shaft 68 and the transducer 64.

An adapter mount 70 is keyed to the end of the probe shaft 68 and fixed thereto by a screw 72 (although the probe shaft 68 is illustrated as being circular in cross section, with a squared end part for keying to the mount 70, the entire probe shaft 68 may be formed with a square or other non-circular cross section). A second jaw 74 is fixed to the adapter mount 70 by a plurality of threaded fasteners 76. The second jaw 74 has an inner face 74a which faces the first jaw 14, and an outer face 74b which faces in the opposite direction from the inner face 74a. Preferably, the heads of the fasteners 76 are recessed below the outer face 74b of the second jaw 74.

A threaded bore 77 is formed through the second jaw 74. An adjustable, replaceable probe contact tip 78 threaded into the bore 77 extends out of the outer face 74b of the second jaw 74. The contact tip 78 may be adjusted inwardly or outwardly relative to the outer face 74b for the purposes of calibrating the measuring instrument 62, but will not normally be moved.

During calibration of the measuring instrument 62, a relationship is established between the electrical signal generated by the measuring instrument 62 and the longitudinal distance between the contact tip 78 and the reference surface defined by the three screws 18. The electrical signal generated by the measuring instrument 62 may, for example, drive an output display (not shown) mounted on the transducer 64, or may be sent to remote equipment (not shown) via a wire (not shown) plugged into a jack 80 (FIG. 1) mounted in the body of the transducer 64.

In operation, the mount 10 may be clamped to the door seal flange 58, as described above with reference to FIGS. 2 and 3, at a location where the contact tip 78 of the measuring instrument 62 will be contacted by the door 60 when the door 60 is moved to a closed position (shown in phantom in FIG. 3). Once the door 60 is closed, and steady conditions are observed to exist, a reading of the distance measurement signal from the measuring instrument 62 may be recorded.

It is anticipated that the mount 10 will greatly speed up the process of taking measurements in many situations. For example, during assembly of a prototype vehicle, measurements may be desired between the door seal flanges 58 and the associated doors 60 at eight locations around the door opening for all four doors of a sedan automobile. A conventional method such as placing lumps of clay at each of the thirty-two locations, closing and opening each door, and measuring the thickness of each lump of clay, may easily take one-half hour. In contrast, it is expected that thirty-two of the mounts 10 with associated measuring instruments 62, connected to a single data logging device (not shown), can be clipped to the door seal flanges 58 at each of the eight locations for each door 60, the doors 60 closed, and the thirty-two measurements recorded in about two minutes. The mounts 10 can be removed from the door seal flanges 58 even more quickly, resulting in a substantial time savings over conventional methods, while producing results of increased accuracy and repeatability over conventional methods.

A second embodiment of a mount according to the invention is illustrated in FIGS. 4 and 5 and indicated generally at 100. The mount 100 is adapted to support the measuring instrument 62 in a position to measure a gap between a first part such as a seal flange 102 for a trunk and a second part such as a trunk deck lid lip 104 which is movable relative to the seal flange 102. The measuring instrument 62 supported by the mount 100 may be the same measuring instrument 62 as that can be supported by the mount 10. However, since in the arrangement shown in FIG. 4, the part to be engaged by the second jaw 74 is a lip 104 approaching the second jaw 74 generally perpendicularly to the face 74b of the second jaw 74, the contact tip 78 is removed, and the face 74b is the surface contacted by the lip 104. This change and any differences in the relative location of the reference surfaces for the mount 10 and the mount 100 will be accounted for when the measuring instrument 62 is calibrated after being attached to the mount 100.

The mount 100 includes a strongback 112 which is generally similar to the strongback 12. The strongback 112 has a first end 112a, a second end 112b, a first face 112c, and a second face 112d. The strongback 112 has a first jaw 114 which extends perpendicularly to the longitudinal axis of the strongback 114.

Unlike the first jaw 14 described above with respect to the first embodiment, the first jaw 114 has a flange 115 extending perpendicularly thereto. The flange 115 is parallel to and spaced apart from the first face 112c of the strongback 112. Three threaded bores 116 are formed through the flange 115, arranged in a triangular arrangement similar to the bores 16 of the mount 10 described above. A respective one of three screws 118 is screwed into each of the bores 116. The screws 118 have pointed ends which extend perpendicularly from the flange 115 toward the face 112c of the strongback 112. The screws 118 and the flange 115 form a clamp portion 119 of the strongback 112. The clamp portion 119 forms part of a clamp assembly 120, which will be described in detail below.

The strongback 112 includes a pair of transversely spaced apart locating arms 121, which are similar in structure, location, and function to the locating arms 21 of the mount 10, as described above.

A recess 122 is formed in the face 112c of the strongback 112, which is similar in structure, location, and function to the recess 22 of the mount 10, as described above.

The strongback 112 further includes a pair of transversely spaced apart ramps 126 which are formed integrally therewith, or fixed to the strongback 112 by any suitable means. The ramps 126 are located on the surface of the strongback in the region between the flange 115 and the face 112c. The ramps 126 have parallel inclined surfaces 126a which are inclined from the face 112c to the first jaw 114, with the thickest part of the ramps 126 (where the surface 126a is farthest from the face 112c of the strongback) adjacent the first jaw 14. The purpose of the ramps 126 will be discussed below.

The strongback 112 further includes a pair of transversely spaced apart pivot mount arms 127 (one of which is shown in FIG. 4). The pivot mount arms 127 extend perpendicularly from the face 112c of the strongback 112 to respective free ends thereof. The free ends of the pivot mount arms 127 have bores formed therethrough which extend transversely to the lengthwise axis of the strongback 112. A pin 128 extends through the transverse bores in the pivot mount arms 127, and is captured therein.

The clamp assembly 120 includes a clamp member 136 which is pivotally mounted on the pin 128 between the pivot mount arms 127. The clamp member 136 is formed as an elongate flat strip of stiff metal, having a transverse bore formed therein, through which the pin 128 extends. The clamp member 136 has a transverse width which is less than the transverse distance between the ramps 126, and the clamp member 136 is centered on the pin 128, so that the end of the clamp member 136 opposite the pivotally mounted end can be moved between the ramps 126.

The clamp member 136 has a threaded contact tip 137 which is disposed in a threaded bore extending through the clamp member 136, which holds the contact tip 137 in a position to be urged toward the clamp portion 119 formed on the flange 115 of the strongback 112. If no part, such as the seal flange 102, is interposed between the clamp member 136 and the flange 115, the contact tip 137 can contact the flange 115 at a central part of the clamp portion 119 bounded by the location of the screws 118.

The contact tip 137 of the clamp member 136 is urged away from the clamp portion 119 by an extension spring 138 to an unclamped or open position of the clamp assembly 120. One end of the spring 138 engages a retainer 139 which is fixed to the clamp member 136. The other end of the spring 138 engages a retainer 140 which is fixed to the face 112c of the strongback 112. It will thus be understood that the spring 138 remains in tension for substantially all positions of the clamp member 136.

A roller assembly 141 is disposed transversely between the clamp member 136 and the face 112c of the strongback 112. The roller assembly 141, as best seen in FIG. 5, includes a center roller 141a, and two end rollers 141b. The center roller 141a and the end rollers 141b are mounted to rotate independently about a common shaft 142. The center roller 141a engages the face of the clamp member 136 which is closest to the face 112c of the strongback 112. Each of the end rollers 141 engages the inclined surface 126a of a respective one of the ramps 126.

Each end of the shaft 142 is pivotally connected to one end of a respective link 144. The other end of each link 144 is pivotally connected to an unclamping member 148. Thus the links 144 are similar in structure to the links 44 described above with respect to the mount 10.

The unclamping member 144 is similar in structure, function, and location to the unclamping member 44 described above with respect to the mount 10. The unclamping member 144 is pivotally mounted on the locating arms 121. A recess 155 is formed in the unclamping member 148. A clamping spring 156, similar in structure, function, and location to the clamping spring 56 described above with respect to the mount 10, has a first end seated in the recess 155 of the unclamping member 148, and a second end seated in the recess 122 of the strongback 112.

The clamping spring 156 urges the unclamping member 148 to rotate clockwise (as viewed in FIG. 4), which causes the unclamping member 148, acting through the links 144, to urge the roller assembly 141 rightwardly, generally toward the first end 112a of the strongback, and upwardly along the inclined surfaces 126a of the ramps 126. The outer rollers 141b of the roller assembly 141 only contact the respective surface 126a (as seen in FIG. 5), and rotate freely clockwise about the shaft 142 (as viewed in FIG. 4). The center roller 141a only contacts the clamp member 136 (as seen in FIG. 5), and rotates freely counterclockwise about the shaft 142 (as viewed in FIG. 4). Thus, the roller assembly 141 has little friction loss as the roller assembly 141 operates to urge the clamp member 136 toward a closed or clamped position. Thus, the clamping spring 156, acting through the unclamping member 148, the links 144, and the roller assembly 141, overcomes the spring 138, and forces the clamp member 136 toward the clamped position.

When the unclamping member 148 is squeezed by a user to rotate counterclockwise to the position shown in phantom in FIG. 4, the unclamping member 148, acting through the links 144, acts to retract the roller assembly 141 leftwardly, toward the second end 112b of the strongback 112. This allows the clamp member 136 to retract to the unclamped position thereof under the urging of the spring 138.

In operation, the clamp assembly 120 is operated to move the clamp member 135 to the unclamped position thereof, and then moved to the desired location on the seal flange 102. Note that, as shown in FIG. 4, the face of the first jaw 114 which is closest to the second end 112b of the strongback 112, acts as the reference surface of the strongback 112, and thus is placed in contact with the seal flange 102.

The unclamping member 148 is then released, allowing the roller assembly 141 to be urged up the ramps 126 under the urging of the clamping spring 156, and moving the contact 137 of the clamp member 136 to engage the flange 102, clamping the flange 102 between the contact tip 137 and the clamping portion 119. If the user determines that the mount 100 should be moved, the unclamping member 148 is squeezed to compress the clamping spring 156, allowing the mount to be easily repositioned with one hand.

If the particular situation is such that the user might have difficulty putting the fingers of the user's hand between the flange 102 or similar part and the unclamping member 148, the unclamping member 148 can be reshaped to provide finger recesses near the second end 112b of the strongback 112 to provide such access. Indeed, the components of the mount 100 (or the mount 10) can be rearranged to permit the unclamping member 148 (or the unclamping member 48) to act on the links 144 (or the links 44) from many different angles.

The trunk deck lid can then be closed, causing the lip 104 thereof to contact the second jaw 74 of the measuring instrument 62, moving it to the position indicated in phantom in FIG. 4 when the lip 104 is in the closed position thereof. The measuring instrument 62 will have been calibrated to generate an electrical signal which indicates the longitudinal distance between the lip 104 in contact with the second jaw 74 and the reference surface on the first jaw 114. The trunk deck lid can then be opened, and the mount 100 removed.

It is anticipated that multiple mounts 100 would be clamped to various locations about a trunk seal flange 102, and the measuring instruments 62 mounted thereon would be connected to a common data recorder placed in the trunk before the trunk deck lid is closed. The data recorder could then simultaneously record the relative positions of the trunk deck lid lip 104 and the flange 102 for all the locations at which a mount 100 is clamped.

It will be appreciated that other arrangements may be made to urge the contact tip 137 of the clamp member 136 away from the clamp portion 119 toward a position close to the face 112c of the strongback 112 (the open or unclamped position of the clamp assembly 120). It is contemplated, for example, that the clamp member 136 could be made as a leaf spring, rigidly fixed at one end to the mounting arms 127, and normally extending toward the unclamped position. When the unclamping member 148 is released to urge the roller assembly 141 up the ramps 126, the clamp member 136 will be contacted by the center roller 141a, and bent into the clamped position. When the unclamping member 148 is squeezed by the user to retract the roller assembly 141, the clamp member 136 springs back to the unclamped position. In such an arrangement, there would be no need for the spring 138.

It is also contemplated that instead of the ramps 126 being formed on the strongback 112, the clamping member 136 could have a ramp (not shown) fixed to the face of the clamping member 136 closest to the face 112c of the strongback 112, or the clamping member 136 could be formed as a wedge-shaped member. The ramp would have a thicker section toward the first end 112a of the strongback 112. In this embodiment, the roller assembly 141 would be advanced longitudinally along the face 112c of the strongback 112. The center roller 141a, which could be of smaller diameter than the outer rollers 141b so as not to contact the face 112c, would contact the ramp on the clamping member 136. As the roller assembly 141 was progressively advanced toward the first end 112a, the center roller 141a would cooperate with the ramp on the clamping member 136 to urge the contact tip 137 toward the clamp portion 119.

A third embodiment of a mount according to the invention is illustrated in FIGS. 6 through 8 and indicated generally at 200. The mount 200 includes a strongback 202. The strongback 202 is an elongated member including a base 204 and a pair of laterally spaced apart side flanges 206 and 208. The base 204 has an upper face 210 and a lower face 212. Four threaded holes 214 are formed through the base 204. Each of the side flanges 206 and 208 includes a central portion 216 adjacent to the base 204, a rear portion 218 extending rearward from the base 204, and an upwardly recessed front portion 220 extending forward from the base 204. The central portion 216 of each of the side flanges 206 and 208 includes a central arm 222 having a threaded hole 224 formed therethrough. An opening 226 having an oval shape is formed through each of the central portions 216 adjacent to the central arm 222. The front portion 220 of each of the side flanges 206 and 208 includes a front arm 228 having a pair of unthreaded holes 230 formed therethrough, and a pivot mount arm 232 having a threaded hole 234 formed therethrough.

An end block 236 having an L-shaped cross section is attached to the front portion 220 of the strongback 202. A pair of threaded bores 238 are formed through the end block 236. The threaded bores 238 are aligned with the unthreaded holes 230 in the front arms 228 of the strongback, and four threaded fasteners 240 are inserted through the holes 230 and into the bores 238 to secure the end block 236 to the strongback 202. A longitudinally extending threaded bore 242 is formed through the lower portion of the end block 236, and a hardened steel hollow set screw 243 threaded into the bore 242. The hollow set screw 243 has a bore with a hexagonal cross-section extending therethrough. A pair of upper protrusions 244 and 245 are formed on the upper corners of the rear face of the end block 236, and a lower protrusion 246 is formed in the center of the lower edge of the rear face. The protrusions 244, 245 and 246 form respective apexes of a triangular region defined thereby on the rear face of the end block 236. The surfaces of the three protrusions 244, 245 and 246 define a plane which is perpendicular to the longitudinal axis of the strongback 202. The protrusions 244, 245 and 246 in combination form a reference surface of the mount 10. The end block 236 including the protrusions 244, 245 and 246 forms a clamp portion, indicated generally at 248, of a clamp assembly, indicated generally at 250.

The mount 200 also includes an unclamping member 252 having a central portion 254 and a pair of laterally spaced apart side flanges 256 and 258. An unthreaded upper hole 260 and an unthreaded lower hole 262 are formed through the front end of each of the side flanges 256 and 258. The unclamping member 252 is pivotally mounted to the central arms 222 of the strongback 202 by a pair of shoulder screws 264 (one is shown). The shoulder screws 264 pass through the respective unthreaded upper hole 260 of each of the side flanges 256 and 258, and engage the respective threaded hole 224 in each of the central arms 222.

A pivot block 266 is pivotally attached to the strongback 202. The pivot block 266 includes an upper portion 268, a central portion 270 and a lower portion 272. An unthreaded bore 274 is formed transversely through the central portion 270 of the pivot block 266. The unthreaded bore 274 is aligned with the threaded holes 234 in the pivot mount arms 232 of the strongback 202. A pair of screws 276 having an unthreaded end portion are inserted through the threaded holes 234 and into the unthreaded bore 274 on both sides of the pivot block 266 to pivotally attach the pivot block 266 to the strongback 202. A threaded bore 278 is formed longitudinally through the upper portion 268 of the pivot block 266. A clamp member 280 in the form of a threaded fastener is secured inside the threaded bore 278.

As shown in FIGS. 7 and 8, the head 282 of the clamp member 280 extends forward from the pivot block 266 a short distance. The lower portion 272 of the pivot block 266 is shorter in the transverse direction than the central portion 270, so that the lower portion 272 is spaced apart from the flange 206 of the strongback 202 by a gap 284 on one side of the lower portion 272 and is spaced apart from the flange 208 of the strongback 202 by a larger gap 286 on the other side. A threaded bore 288 is formed transversely through the lower portion 272 of the pivot block 266.

The mount 200 further includes a link 290 connecting the unclamping member 252 and the pivot block 266. The link 290 is disposed inside the strongback 202 adjacent to the side flange 206 of the strongback 202. The link 290 is a relatively thin, elongated plate having preferably rounded front and rear ends 292 and 294. An unthreaded hole 296 is formed through the front end 292 of the link 290. The front end 292 of the link 290 is disposed in the gap 284 (adjacent the lower portion 272) of the pivot block 266. A shoulder screw 298 is inserted through the unthreaded hole 296 of the link 290 and into the threaded bore 288 in the lower portion 272 of the pivot block 266 to pivotally attach the front end 292 of the link 290 to the pivot block 266. A threaded hole 300 is formed through the rear end 294 of the link 290. The rear end 294 of the link 290 is disposed inside the strongback 202, adjacent to the opening 226 in the side flange 206 of the strongback 202. The side flange 256 of the unclamping member 252 is disposed outside the strongback 202 adjacent to the side flange 206. The unthreaded lower hole 262 through the side flange 256 of the unclamping member 252 is disposed adjacent to the opening 226 in the side flange 256. A shoulder screw 302 is inserted through the unthreaded lower hole 262 in the unclamping member 252, through the opening 226 in the side flange 206 of strongback 202, and into the threaded hole 300 in the rear end 294 of the link 290 to pivotally attach the rear end 294 of the link 290 to the unclamping member 252.

The central portion 254 of the unclamping member 252 has a cylindrical recess 303 (FIGS. 7 and 8) formed in the face thereof which faces the strongback 202. A cylindrical recess 304 is also formed in the upper surface 306 of a measuring instrument 308 which may be used with the mount 200. A helically coiled clamping spring 310 has a first end thereof seated in the recess formed in the unclamping member 252 and a second end thereof seated in the recess 304 formed in the measuring instrument 308. The clamping spring 310 urges the rear end 312 of the unclamping member 252 to move relatively away from the measuring instrument 308 and the strongback 202. Thus the clamping spring 310 urges the unclamping member 252 to pivot clockwise (as viewed from the perspective of FIGS. 6 through 8) about the axis of rotation defined by the shoulder screws 264. As described above, the rear end 294 of the link 290 is pivotally attached to the unclamping member 252 by the threaded fastener 302. When the unclamping member 252 pivots clockwise (as indicated by an arrow A1 in FIG. 8), the link 290 is pulled in the rearward direction (to the left as indicated by an arrow A2 in FIG. 8) by the shoulder screw 302. The oval-shaped opening 226 in the strongback 202 allows the rearward movement of the shoulder screw 302 without contacting the side flange 206 of the strongback 202 through which the shoulder screw 302 extends. As described above, the front end 292 of the link 290 is pivotally attached to the lower portion 272 of the pivot block 266. When the link 290 moves in the rearward direction, the link 290 pulls the lower portion 272 of the pivot block 266 in the rearward direction. This causes the upper portion 268 of the pivot block 266 to move in the forward direction toward the end block 236 (as shown by an arrow A3 in FIG. 8). The clamp member 280 attached to the upper portion 268 of the pivot block 266 moves toward the clamp portion 248 defined by the end block 236 and the protrusions 244, 245 and 246. Thus the clamping spring 310 urges the clamp assembly 250 to a closed or clamped condition (shown in FIG. 8) in which the clamp member 280 is moved as close as possible to the clamp portion 248.

As shown in FIG. 7, the unclamping member 252 may be squeezed by the user to compress the clamping spring 310 and apply a force acting through the link 290 which urges the clamp member 280 to move relatively away from the clamp portion 248, thereby opening the clamp assembly 250. With the clamp assembly 250 in this open, or unclamped, condition, the mount 200 may be moved to engage a part, such as a door seal flange 314, with the reference surface defined by the three protrusions 244, 245 and 246 in contact with the flange 314 at a desired location on the flange 314.

As shown in FIG. 8, the unclamping member 252 may then be released by the user, allowing the clamping spring 310 to pivot the unclamping member 252 in the clockwise direction as indicated by arrow A1. As described above, the pivoting unclamping member 252 applies a force in the direction of arrow A2, which acts through the link 290 which urges the pivot block 266 to rotate clockwise in the direction of arrow A3. Rotation of the pivot block 266 in the direction of arrow A3 causes the clamp member 280 to contact the rear face of the flange 314, opposite the clamp portion 248. The clamp assembly 250 squeezes the flange 314, causing the three protrusions 244, 245 and 246 of the clamp portion 248 to firmly contact the flange 314. The use of three protrusions 244, 245 and 246 ensures that the clamp assembly 250 will be stable relative to the flange 314, thereby holding the mount 200 in a stable, fixed relationship with the flange 314, with the reference surface of the strongback 202 (defined by the surfaces of the protrusions 244, 245 and 246) in contact with the flange 314.

The measuring instrument 308 which may be used with the mount 200 includes an electronic transducer 318. The transducer 318 is mounted inside the strongback 202, with a lower front surface 320 of the transducer 318 disposed on the upper surface 210 of the base 204. Four unthreaded bores 322 are formed through the transducer 318. The transducer 318 is secured to the strongback 202 by four elongated, threaded fasteners 324 which extend through the unthreaded bores 322 and engage the threaded holes 214 in the base 204 of the strongback 202.

The measuring instrument 308 further includes a probe shaft 326 which is extensible relative to the transducer 318 on a path which is perpendicular to the plane defined by the surfaces of the protrusions 244, 245 and 246, that is, perpendicular to the reference surface of the strongback 202. The transducer 318 monitors the movement of the probe shaft 326 to develop an electrical signal representative of the relative position of the probe shaft 326 and the transducer 318. A threaded bore 328 is formed in the front end of the probe shaft 326.

An adapter mount 330 is secured to the end of the probe shaft 326. An unthreaded bore 332 is formed in the rear end of the adapter mount 330, and a smaller unthreaded counterbore (not shown) is formed forward from the unthreaded bore 332. A threaded fastener such as a cap screw 334 is inserted through the unthreaded counterbore and into the threaded bore 328 in the front end of the probe shaft 326 to secure the adapter mount 330 to the probe shaft 326. A pair of transversely spaced arms 336 extend forward from the adapter mount 330. Each of the arms 336 has an unthreaded hole 338 formed therethrough.

An adapter extension 340 is attached to the front end of the adapter mount 330. A transversely extending unthreaded bore 342 is formed through the rear end of the adapter extension 340. The rear end of the adapter extension 340 is disposed between the arms 336 on the front end of the adapter mount 330. The unthreaded bore 342 through the adapter extension 340 is aligned with the unthreaded holes 338 in the arms of the adapter mount 330, and a roll pin 344 is pressed into the bore 342 and the holes 338 to secure the adapter extension 340 to the adapter mount 330. The adapter extension 340 can slide on the roll pin 344 from side to side between the arms 336, and it can rotate on the roll pin 344. A longitudinally extending unthreaded bore 346 is formed through the adapter extension 340. Optionally, the rear end of the bore 346 can be threaded and a threaded cap screw 347 inserted to hold the roll pin 344 in place. A transversely extending threaded bore 348, formed through the front end of the adapter extension 340, intersects with the longitudinally extending bore 346.

A thin, elongated extension rod 350 having a hexagonal cross-section is attached to the front end of the adapter extension 340. The extension rod 350 is preferably case hardened steel. The rear end 352 of the extension rod 350 is disposed inside the longitudinally extending bore 346 in the adapter extension 340. A threaded fastener such as a set screw 354 is inserted into the transversely extending threaded bore 348 in the adapter extension 340, and into engagement with the rear end 352 of the extension rod 350, to secure the extension rod 350 to the adapter extension 340. When the measuring instrument 308 is attached to the mount 200, the extension rod 350 passes through the gap 286 adjacent to the lower portion 272 of the pivot block 266 and through the hexagonal bore through the set screw 243 in the lower portion of the end block 236. The front end 356 of the extension rod 350 extends forward from the end block 236.

A tip adapter 358 is attached to the front end 356 of the extension rod 350. A longitudinally extending unthreaded bore 360 is formed through the lower portion of the tip adapter 358. A transversely extending threaded bore 362, formed through the lower portion of the tip adapter 358, intersects with the longitudinally extending bore 360. The front end 356 of the extension rod 350 is disposed inside the longitudinally extending bore 360. A threaded fastener such as a set screw 364 is inserted into the transversely extending threaded bore 362 and into engagement with the front end 356 of the extension rod 350, to secure the tip adapter 358 to the extension rod 350. A longitudinally extending threaded bore 366 is formed through the upper portion of the tip adapter 358. A contact tip 368 threaded into the bore 366 extends forward a short distance from the front side of the tip adapter 358. During calibration of the measuring instrument 308, a relationship is established between the electrical signal generated by the measuring instrument 308 and the longitudinal distance between the contact tip 308 and the reference surface defined by the three protrusions 244, 245 and 246.

Figure 9:
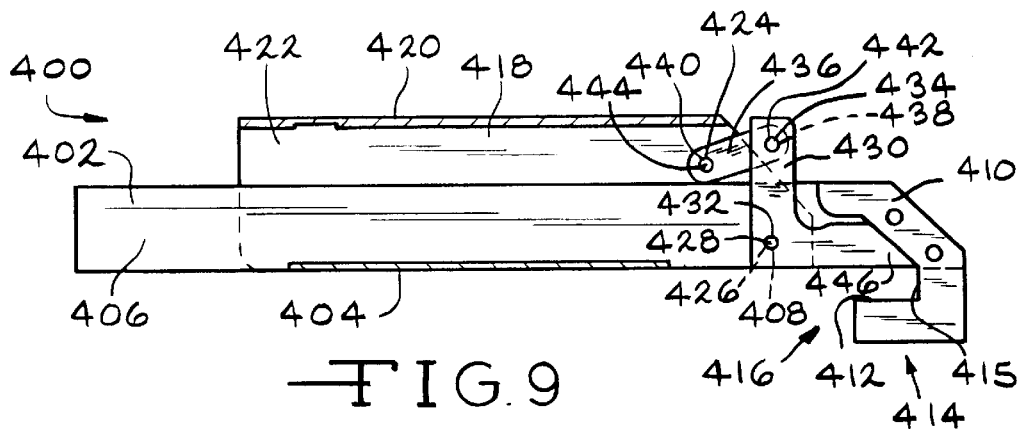
FIG. 9 is a side elevational view, partly in section, of a fourth embodiment of a mount according to the invention, showing a clamp being held open for engaging a part.
Figure 10:
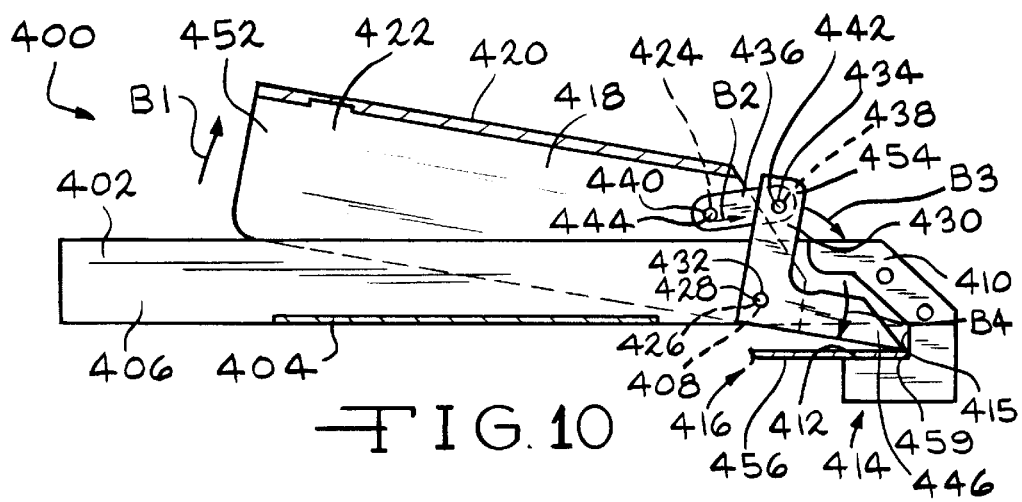
FIG. 10 is a view similar to FIG. 9, except showing the clamp released to engage the part.
Figure 11:
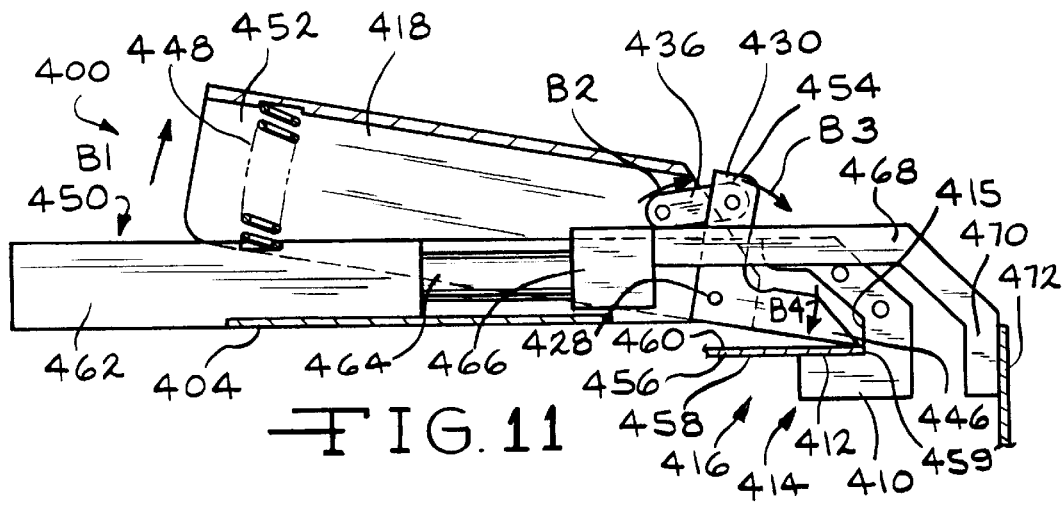
FIG. 11 is a view similar to FIG. 10, except showing a side elevational view of a measuring instrument mounted thereon, and showing a measuring tip of the measuring instrument extended to engage a second part.

A fourth embodiment of a mount according to the invention is illustrated in FIGS. 9 through 11 and indicated generally at 400. The mount 400 includes a strongback 402. The strongback 402 is an elongated member including a base 404 and a pair of laterally spaced apart side flanges 406 (one is shown). An unthreaded hole 408 is formed through the lower front portion of each side flange 406.

A flange member 410 is attached to the front end of one of the side flanges 406 of the strongback 402. The flange member 410 has a clamping surface 412. A second flange member 410 (not shown) similar in structure to the flange member 410 is attached to the front end of the other one of the side flanges 406. The two flange members 410 in combination form a clamp portion, indicated generally at 414, of a clamp assembly, indicated generally at 416. The flange members 410 each have a reference surface 415.

The mount 400 also includes an unclamping member 418 having a central portion 420 and a pair of laterally spaced apart side flanges 422 (one is shown). An unthreaded upper hole 424 and an unthreaded lower hole 426 are formed through the front end of each side flange 422. The unclamping member 418 is pivotally mounted to the side flanges 406 of the strongback 402 by a pair of shoulder screws 428 (one is shown). The shoulder screws 428 pass through the unthreaded lower hole 426 of each of the side flanges 422 of the unclamping member 418, and through the unthreaded hole 408 in each of the side flanges 406 of the strongback 402, and engage a threaded central bore 432 formed through a clamp member 430.

The clamp member 430 is pivotally mounted between the side flanges 406 of the strongback 202. The shoulder screws 428 engage the threaded central bore 432 to pivotally attach the clamp member 430 to the side flanges 406. An unthreaded upper bore 434 is also formed through clamp member 430. A link 436 is pivotally attached between the clamp member 430 and the unclamping member 418. A threaded front hole 438 and a threaded rear hole 440 are formed through the link 436. A shoulder screw 442 extends through the unthreaded upper bore 434 of the clamp member 430 and engages the threaded front hole 438 of the link to pivotally attach the link 436 to the clamp member 430. A shoulder screw 444 also extends through the upper hole 424 of the side flange 422 of the unclamping member 418 and engages the threaded rear hole 440 of the link to pivotally attach the link 436 to the unclamping member 418. The clamp member 430 includes a clamping end 446.

As shown in FIG. 11, a helically coiled clamping spring 448 is seated between the unclamping member 418 and a measuring instrument, indicated generally at 450, which may be used with the mount 400. The clamping spring 448 urges the rear end 452 of the unclamping member 418 to move relatively away from the measuring instrument 450 and the strongback 402. Thus the clamping spring 448 urges the unclamping member 418 to pivot clockwise (as viewed from the perspective of FIGS. 9 through 11) about the axis of rotation defined by the threaded fasteners 428. As shown in FIGS. 10 and 11, when the unclamping member 418 pivots clockwise as indicated by an arrow B1, the link 436 is pushed in the forward direction (to the right in FIGS. 10 and 11 as indicated by an arrow B2). When the link 436 moves in the forward direction, the link 436 pushes the upper end 454 of the clamp member 430 in the forward direction. The clamp member 430 pivots clockwise about the threaded fastener 428, as indicated by an arrow B3, causing the clamping end 446 of the clamp member 430 to move downward toward the clamp portion 414 defined by the flange members 410, as indicated by an arrow B4 of FIGS. 10 and 11. Thus the clamping spring 448 urges the clamp assembly 416 to a closed or clamped condition (shown in FIGS. 10 and 11) in which the clamping end 446 of the clamp member 430 is moved as close as possible to the clamp portion 414.

As shown in FIG. 9, the unclamping member 418 may be squeezed by the user to compress the clamping spring 448 (FIG. 11) and apply a force acting through the link 436 which urges the clamping end 446 of the clamp member 430 to move relatively away from the clamp portion 414, thereby opening the clamp assembly 416. With the clamp assembly 416 in this open, or unclamped, condition, the mount 400 may be moved to engage a part, such as a trunk flange 456 (FIGS. 10 and 11), with the reference surfaces 415 of the flange members 410 in contact with the edge 459 of the flange 456 at a desired location. Typically, the trunk flange 456 will be oriented vertically, so that the mount 400 will be attached with its longitudinal axis extending vertically, i.e., rotated ninety degrees from the orientation shown in FIGS. 9 through 11.

As shown in FIG. 10, the unclamping member 418 may then be released by the user, allowing the clamping spring 448 to pivot the unclamping member 418 in the clockwise direction. As described above, the pivoting unclamping member 418 applies a force acting through the link 436 which urges the clamping end 446 of the clamp member 430 to contact the inner face 460 of the flange 456 (FIG. 11), opposite the clamp portion 414. The clamp assembly 416 squeezes the flange 456, causing the clamping surfaces 412 of the clamp portion 414 to firmly contact the flange 456. The mount 400 is held in a stable, fixed relationship with the flange 456, with the reference surfaces 415 in contact with the edge 459 of the flange 456.

As shown in FIG. 11, the measuring instrument 450 which may be used with the mount 400 includes an electronic transducer 462. The transducer 462 is mounted inside the strongback 402. The measuring instrument 450 further includes a probe shaft 464. The probe shaft 464 is extensible relative to the transducer 462 on a path which is parallel to the plane defined by the clamping surfaces 412 and perpendicular to the reference surfaces 415 of the mount 400. An adapter mount 466 is attached to the front end of the probe shaft 464. An elongated measuring tip 468 is attached to the front end of the adapter mount 466. The measuring tip 468 includes a contact tip 470 on the end of the measuring tip 468. During calibration of the measuring instrument 450, a relationship is established between the electrical signal generated by the measuring instrument 450 and the longitudinal distance between the contact tip 470 and the reference surfaces 415.

In operation, the mount 400 may be clamped to the trunk flange 456 at a location where the contact tip 470 of the measuring instrument 450 will be contacted by the trunk lid 472 when the trunk lid is closed. Once the trunk lid 472 is closed, and steady conditions are observed to exist, a reading of the distance measurement signal from the measuring instrument 450 may be recorded.

A fifth embodiment of a mount according to the invention is illustrated in FIGS. 12 through 15 and indicated generally at 500. The mount 500 includes a strongback 502. The strongback 502 is an elongated member including a base 504 and a pair of laterally spaced apart side flanges 506 (one is shown). A threaded hole 508 is formed through the lower portion of each side flange 506.

A pair of spaced apart cover plates 510 (one is shown) are attached to the upper end of the side flanges 506 of the strongback 502. The cover plates 510 extend generally perpendicular to the longitudinal axis of the strongback 502. The extending cover plates 510 provide a means for clamping onto a part when the part is obstructed by another structure. Each cover plate 510 has a clamping surface 512. The cover plates 510 in combination form a clamp portion, indicated generally at 514, of a clamp assembly, indicated generally at 516. The clamping surfaces 512 of the cover plates 510 are at right angles to a reference surface 517 of the mount 500. The reference surface 517 is defined by portions of the cover plates 510 defining a plane perpendicular to the longitudinal axis of the strongback 502, at a position to contact an edge of a flange clamped in the clamp assembly 516.

The mount 500 also includes an unclamping member 518 having a central portion 520 and a pair of laterally spaced apart side flanges 522 (one is shown). An unthreaded pivot hole 524 is formed through the lower end of each side flange 522, and an unthreaded link attachment hole 526 is formed through the lower end of one of the side flanges 522. The unclamping member 518 is pivotally mounted to the side flanges 506 of the strongback 502 by a pair of shoulder screws 528 (one is shown). The shoulder screws 528 pass through the unthreaded pivot hole 524 of each of the side flanges 522 of the unclamping member 518, and engage the threaded hole 508 in each of the side flanges 506 of the strongback 502.

A clamp member 530 is pivotally mounted to one of the cover plates 510. The clamp member 530 includes a clamping end 531. A threaded first hole 532 and a threaded second hole 534 are formed through the clamp member 530. A threaded hole 536 and a threaded hole 538 are also formed through the cover plate 510, adjacent to the first and second holes 532 and 534 of the clamp member 530. A pivot piece 540 is provided having unthreaded upper and lower holes 542 and 544 formed therethrough. The upper hole 542 of the pivot piece 540 is aligned with the threaded hole 536 of the cover plate 510, and a shoulder screw 546 is inserted to pivotally attach the pivot piece 540 to the cover plate 510. The lower hole 544 of the pivot piece 540 is aligned with the first hole 532 of the clamp member 530, and a shoulder screw 548 is inserted to pivotally attach the pivot piece 540 to the clamp member 530.

A bell crank 550 is provided having unthreaded first and second end holes 552 and 554 and an unthreaded central hole 556 formed therethrough. The central hole 556 of the bell crank 550 is aligned with the second hole 538 of the cover plate 510, and a shoulder screw 558 is inserted to pivotally attach the bell crank 550 to the cover plate 510. The first end hole 552 of the bell crank 550 is aligned with the second hole 534 of the clamp member 530, and a shoulder screw 560 is inserted therethrough to pivotally attach the bell crank 550 to the clamp member 530.

An elongated link 562 is pivotally attached between the bell crank 550 and the unclamping member 518. Threaded upper and lower end holes 564 and 566 are formed through the link 562. The upper end hole 564 of the link 562 is aligned with the second end hole 554 of the bell crank 550, and a shoulder screw 568 is inserted to pivotally attach the link 562 to the bell crank 550. The lower end hole 566 of the link 562 is aligned with the link attachment hole 526 of the unclamping member 518, and a shoulder screw 570 is inserted to pivotally attach the link 562 to the unclamping member 518.

A helically coiled clamping spring 572 is seated between the unclamping member 518 and a measuring instrument 574 (shown in FIG. 14) which may be used with the mount 500. The clamping spring 572 urges the upper end 576 of the unclamping member 518 to move relatively away from the measuring instrument 574 and the strongback 502. Thus the clamping spring 572 urges the unclamping member 518 to pivot clockwise (as viewed from the perspective of FIGS. 12 and 13) about the axis of rotation defined by the shoulder screws 528.

As shown in FIG. 13, when the unclamping member 518 pivots clockwise as indicated by an arrow C1, the link 562 is pulled in the downward direction as shown by an arrow C2. When the link 562 moves in the downward direction, the link 562 pulls the second end 578 of the bell crank 550 in the downward direction as shown by an arrow C3. The bell crank 550 pivots clockwise about the shoulder screw 558, causing the first end 580 of the bell crank 550 to move in the outward direction (to the left in FIG. 13, as shown by an arrow C4). When the first end 580 of the bell crank 550 moves outward, the clamp member 530 moves in the outward direction toward the clamp portion 514 defined by the cover plates 510, as shown by an arrow C5. Thus the clamping spring 572 urges the clamp assembly 516 to a closed or clamped condition (shown in FIG. 13) in which the clamping end 531 of the clamp member 530 is moved as close as possible to the clamp portion 514, as indicated by an arrow C6.

As shown in FIG. 12, the unclamping member 518 may be squeezed by the user to rotate in a counterclockwise direction, that is in the direction of an arrow C7, to compress the clamping spring 572 and apply a force acting through the link 562 and the bell crank 550. The force acting through the bell crank 550 urges the clamping ends 531 of the clamp member 530 to move relatively away from the clamp portion 514 in a direction indicated by an arrow C8, thereby opening the clamp assembly 516. With the clamp assembly 516 in this open, or unclamped, condition, the mount 500 may be moved to engage a part, such as a trunk flange 582 (FIGS. 13, 14 and 15), and moved downward, in the direction of an arrow C9 (FIG. 13) so that the reference surface 517 defined by the cover plates 510 contacts the edge 585 of the flange 582 at a desired location.

As shown in FIGS. 13 and 14, the unclamping member 518 may then be released by the user, allowing the clamping spring 572 to pivot the unclamping member 518 in the clockwise direction indicated by the arrow C1. The pivoting unclamping member 518 applies a force acting through the link 562 and the bell crank 550 which urges the clamping end 531 of the clamp member 530 in the direction of the arrow C6 to contact the inner face 586 of the flange 582, opposite the clamp portion 514. The clamp assembly 516 squeezes the flange 582, causing the clamping surfaces 512 of the clamp portion 514 to firmly contact the flange 582. The mount 500 is held in a stable, fixed relationship with the flange 582, with the reference surface 517 in contact with the flange 582.

As shown in FIGS. 14 and 15, the measuring instrument 574 which may be used with the mount 500 includes an electronic transducer 588. The transducer 588 is mounted inside the strongback 502. The measuring instrument 574 further includes a spring-loaded probe shaft 590. The probe shaft 590 is extensible relative to the transducer 588 along the longitudinal axis of the strongback 502, on a path which is perpendicular to the plane defined by the reference surface 517 of the mount 500. An adapter mount 592 is attached to the front end of the probe shaft 590. An adapter plate 594 is attached to the front end of the adapter mount 592. A post 596 is attached to the upper end of the transducer 588, the purpose of which will be described below.

A measuring arm 598 is pivotally mounted between the spaced apart cover plates 510 of the mount 500. An unthreaded hole 600 is formed through each cover plate 510. A threaded bore 602 is formed through the measuring arm 598 and aligned with the threaded holes 600. A pair of shoulder screws 603 (one is shown) is inserted in the holes 600 and 602 to pivotally mount the measuring arm 598 between the cover plates 510. An adapter pin 604 is mounted in the inner end 606 of the measuring arm 598 and extends toward the adapter plate 594. The adapter pin 604 may be formed as a threaded rod with a point on the end extending toward the adapter plate 594, or other suitable arrangement. A spring 608 is attached between the inner end 606 of the measuring arm 598 and the post 596 attached to the upper end of the transducer 588. The spring 608 pulls the inner end 606 of the measuring arm 598 toward the transducer 588, so that the adapter pin 604 is pulled into engagement with the adapter plate 594. A contact tip 610 is mounted in the outer end 612 of the measuring arm 598, pointed in the upward direction as seen in FIGS. 14 and 15. During calibration of the measuring instrument 574, a relationship is established between the electrical signal generated by the measuring instrument 574 and the longitudinal distance between the contact tip 610 and the reference surface 517 of the mount 500.

In operation, the mount 500 may be clamped to the trunk flange 582 at a location where the contact tip 610 of the measuring instrument 574 will be contacted by a trunk lid 614 when the trunk lid 614 is closed. FIG. 14 shows the trunk lid 614 moving downward in the direction of an arrow C10 toward the contact tip 610 of the measuring arm 598. FIG. 15 shows the trunk lid 614 closed. It can be seen that the trunk lid 614 pushes down on the outer end 612 of the measuring arm 598 as the trunk lid 614 moves in the direction of the arrow C10 against the contact tip 610. The measuring arm 598 pivots about the shoulder screws 603, causing the inner end 606 of the measuring arm 598 and the adapter pin 604 to move upward away from the transducer 588 in the direction of an arrow C11. This permits the spring-loaded probe shaft 590 to extend from the transducer 588 as indicated by an arrow C12, with the adapter plate 594 maintaining engagement with the adapter pin 604. Once the trunk lid 614 is fully closed, and steady conditions are observed to exist, a reading of the distance measurement signal from the measuring instrument 574 may be recorded. The measurement signal will be representative of the steady state distance between the upper edge of the trunk flange 582 (in contact with the reference surface 517 of the mount 500) and the lower surface of the trunk lid 614, in contact with the contact tip 610 of the measuring instrument 574.

Figure 16:
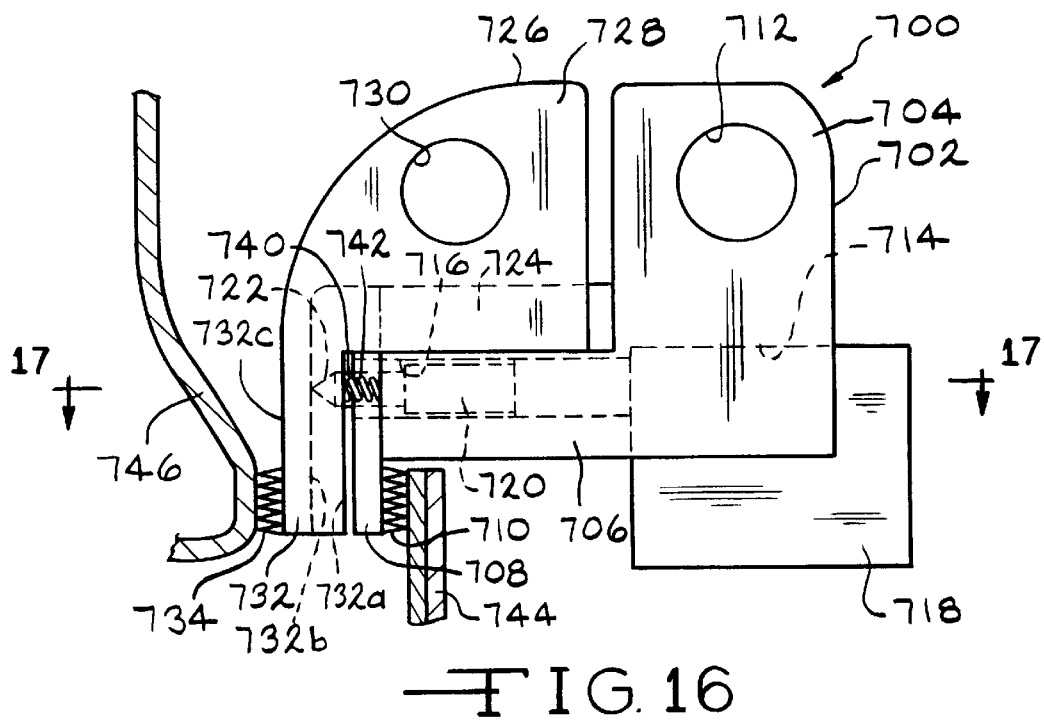
FIG. 16 is a side elevational view of a sixth embodiment of a mount according to the invention, showing a clamp assembly of the mount forced open for engaging first and second parts.
Figure 17:
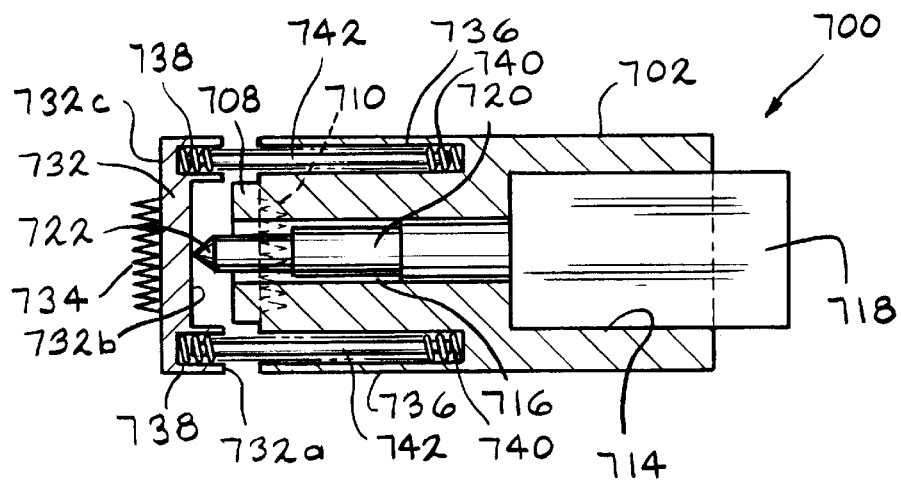
FIG. 17 is a cross-sectional view of the mount taken along line 17—17 of FIG. 16.

A sixth embodiment of a mount according to the invention is illustrated in FIGS. 16 and 17 and indicated generally at 700. As described below, this embodiment is a squeeze grip type of mount. The mount 700 includes a base or strongback 702. The strongback 702 is a generally L-shaped member having an upper portion 704 and a lower portion 706. The upper portion 704 extends upwardly from a first end of the lower portion 706. A flange 708 extends downward from a second end of the lower portion 706. The flange 708 defines a first clamp portion of the mount 700. A grip pad 710 (shown in exaggerated thickness and roughness) is secured to the inner side of the flange 708. The grip pad 710 is a rough surface such as a stick-on piece of sandpaper (e.g., 120 grit sandpaper). The grip pad 710 provides a slip resistant clamping surface for the first clamp portion of the mount 700, and further defines a reference surface of the mount 700. Of course, if desired, three raised contact points could be formed on the flange 708 in place of the grip pad 710, to define a reference surface similar to that defining the screws 18 of the mount 10 described above, for example.

The upper portion 704 of the strongback 702 has an opening 712 formed therethrough. As described further below, the opening 712 functions as a first part of a hand grip for unclamping the mount 700. The person using the mount 700 will usually insert a thumb through the opening 712 for gripping the mount 700.

A cavity 714 is formed in the rear end of the lower portion 706 of the strongback 702. A cylindrical bore 716 extends from the cavity 714 to the front end of the lower portion 706 of the strongback 702. The axis of the bore 716 is perpendicular to the plane defined by the grip pad 710. A measuring instrument such as a probe transducer 718 is suitably secured inside the cavity 714. A spring-loaded probe portion 720 of the probe transducer 718 extends through the bore 716. The probe portion 720 extends telescopically from a fixed housing of the probe transducer 718. A measuring tip 722 is fixed to the front end of the probe portion 720. The measuring tip 722 is extensible relative to the housing of the probe transducer 718 on a path which is perpendicular to the plane defined by the grip pad 710 which defines the reference surface of the mount 700. Normally the probe portion 720 and the measuring tip 722 will be coaxial with the bore 716, being normally mounted so as to be centered in the bore 716.

A slide bearing 724 such as a linear ball slide is secured to the upper surface of the lower portion 706 of the strongback 702. A clamp member 726 of the mount 700 is attached to the slide bearing 724 so that the clamp member 726 is moveable relative to the strongback 702 along an axis parallel to the axis of the bore 716. The clamp member 726 is slidable relative to the strongback 702 on the slide bearing 724.

The clamp member 726 includes an upper portion 728 having an opening 730 formed therethrough. The opening 730 functions as a second part of the hand grip for compressing the mount 700. The person using the mount 700 will usually insert a finger through the opening 730 for gripping the mount 700.

The clamp member 726 also includes a flange 732 extending downward from the upper portion 728. The spring-loaded measuring tip 722 of the probe transducer 718 is disposed to engage the flange 732. The flange 732 includes a first face 732a. A central portion 732b of the first face 732a is recessed. Thus the first face 732 has two spaced apart un-recessed portions separated by the recessed portion 732b. The measuring tip 722 of the probe transducer 718 contacts the recessed portion 732b. A second face 732c of the flange 732, opposite the first face 732b, defines a second clamp portion of the mount 700. A grip pad 734 (shown in exaggerated thickness and roughness) is secured to the second face 732c of the flange 732.

As shown in FIG. 17, a pair of blind ended bores 736 are formed along the sides of the front end of the lower portion 706 of the strongback 702. A pair of recesses 738 are formed along the sides of the flange 732 of the clamp member 726. The recesses 738 of the clamp member 726 are aligned with the bores 736 of the strongback 702. A pair of extension springs 740 are secured inside the bores 736 and recesses 738. A pair of rods 742 are disposed inside the extension springs 740 to keep the extension springs 740 properly aligned. The extension springs 740 urge the clamp member 726 to move away from the strongback 702.

In operation, the user grips the mount 700 in his hand by placing a thumb through the opening 712 in the strongback 702 and a finger through the opening 730 in the clamp member 726. The user squeezes the clamp member 726 against is the strongback 702, thereby compressing the mount 700 in opposition to the urging of the extension springs 740. The compression of the mount 700 minimizes the distance between the grip pad 710 of the strongback 702 and the grip pad 734 of the clamp member 726. The user then inserts the flanges 708 and 732 of the mount 700 between a first part 744 and a second part 746 to be measured for gap distance, such as an aperture body part and a door inner panel of a vehicle. The user then relaxes his grip, allowing the extension springs 740 to urge the clamp member 726 away from the strongback 702. The flange 708 of the strongback 702 moves apart from the flange 732 of the clamp member 726, with the grip pad 710 of the strongback 702 engaging the first part 744 and the grip pad 734 of the clamp member 726 engaging the second part 746. The measuring tip 722 extends from the probe transducer 718 to maintain contact with the flange 732 of the clamp member 726. In this manner, the probe transducer 718 takes a measurement of the gap between the first and second parts 744 and 746. It will be understood that the minimum width gap which may be measured by the probe transducer 718 is determined by the thickness of the flange 732 between the second face 732c and the unrecessed portions of the face 732a. Also, the offset between the grip pad 734 and the grip pad 710 when moved as close together as possible is taken into account during calibration of the probe transducer 718. The measurement is taken quickly and easily. The user then squeezes the mount 700 to release it from the first and second parts 744 and 746. The mount 700 can then be inserted at another location between parts and released for clamping and taking another measurement. Thus, the squeeze grip mount 700 allows multiple measurements to be taken quickly and easily.

In describing the various embodiments of the invention, various springs have been described for urging relative movement of the components of the invention, and have typically been illustrated as metal coil springs. It should be understood that various other spring means for resiliently exerting a force on the components of the invention may suitably be substituted for the illustrated springs, although such substitutions may require some modification to the structures acted upon by the spring means, as is well known. For example, the metal coil spring may be replaced by other metallic springs such as leaf springs or wave springs, or other suitable metallic springs. The spring means may be nonmetallic, such as a resilient polymer or a compressible gas. The spring means may act in compression, tension or both. As used herein the word "spring" should be understood to mean any such suitable spring means.

The principle and mode of operation of this invention have been explained and illustrated in its preferred embodiment. However, it must be understood that this invention may be practiced otherwise than as specifically explained and illustrated without departing from its spirit or scope.

What is claimed is:
1. A mount for a measuring instrument comprising:
   a strongback for mounting a measuring instrument, the strongback defining a reference surface; and
   a spring-loaded clamp assembly for releasably securing the reference surface of the strongback against a desired location on a part.
2. A mount for a measuring instrument comprising:
   a strongback adapted to have a measuring instrument fixed thereto, the strongback defining a clamp portion;
   a reference surface operatively connected to the strongback;
   a clamp member which is selectively movable relative to the clamp portion;
   a spring for exerting a clamping force urging the clamp member toward the clamp portion such that the clamp member cooperates with the clamp portion to clamp a part therebetween to attach the strongback to the part with the reference surface engaging a desired location on the part; and
   an unclamping member for selectively urging the clamp member away from the clamp portion in opposition to the clamping force exerted by the spring.
3. The mount defined in claim 2 wherein the strongback and the clamp member are operative to hold the reference surface in a stable, fixed relationship relative to the part with the reference surface in contact with the part.
4. The mount defined in claim 2 wherein a first end of the unclamping member is pivotally mounted on the strongback.
5. The mount defined in claim 4 wherein the spring urges a second end of the unclamping member away from the strongback to urge the clamp member toward the clamp portion.
6. The mount defined in claim 5 wherein the unclamping member is adapted to be squeezed with one hand to move the second end of the unclamping member toward the strongback to urge the clamp member away from the clamp portion.

7. The mount defined in claim 4 further including a link connected between the unclamping member and the clamp member for urging the clamp member away from the clamp portion when the second end of the unclamping member is moved toward the strongback.

8. The mount defined in claim 2 wherein the reference surface is formed on the strongback.

9. The mount defined in claim 8 wherein the reference surface defines a plane.

10. The mount defined in claim 8 wherein the reference surface is defined by three protrusions arranged in a triangle.

11. The mount defined in claim 2 wherein the clamp portion is fixed to the strongback.

12. The mount defined in claim 2 wherein the clamp member is pivotally connected to the strongback.

13. The mount defined in claim 2 wherein the strongback includes a base and a pair of side flanges which define a U-shaped cross section, and the unclamping member includes a central portion and a pair of side flanges which define a U-shaped cross section, and a first end of the unclamping member is pivotally mounted on the strongback such that the side flanges of the unclamping member are disposed adjacent to the side flanges of the strongback, and the central portion of the unclamping member is spaced apart from the strongback.

14. A measuring assembly comprising:
   a measuring instrument comprising an electronic transducer, a probe shaft which is extensible relative to the transducer, and a measuring tip on the probe shaft; and
   a mount for the measuring instrument comprising:
      a strongback having the measuring instrument fixed thereto;
      a reference surface;
      a clamp assembly comprising a clamp portion and a clamp member which is movable relative to the clamp portion, the clamp member cooperating with the clamp portion to clamp a part therebetween to attach the strongback to the part with the reference surface engaging a desired location on the part, wherein the strongback supports the clamp assembly and the measuring instrument rigidly with respect to the reference surface;
      a spring for urging the clamp member toward the clamp portion; and
      an unclamping member for selectively urging the clamp member away from the clamp portion in opposition to the force means.

15. The measuring assembly defined in claim 14 wherein the reference surface is formed on the strongback.

16. The measuring assembly defined in claim 14 wherein the mount when clamped to the part is held in a stable, fixed relationship relative to the part with the reference surface in contact with the part.

17. The measuring assembly defined in claim 14 wherein a first end of the unclamping member is pivotally mounted on the strongback, and wherein the spring urges a second end of the unclamping member away from the strongback to urge the clamp member toward the clamp portion.

18. A mount for a measuring instrument comprising:
   a strongback adapted to have a measuring instrument fixed thereto, the strongback including a first clamp portion;
   a clamp member which is movably attached to the strongback, the clamp member including a second clamp portion, the first clamp portion and the second clamp portion defining a clamp assembly having a reference surface; and
   a spring for urging the clamp member away from the strongback,
   the strongback and the clamp member being squeezable together in opposition to the urging of the spring to compress the clamp assembly for placement between first and second parts, and the strongback and clamp member being releasable to allow the spring to urge open the clamp assembly for clamping between the first and second parts with the reference surface engaging a desired location on one of the first and second parts.

19. The mount defined in claim 18 wherein the clamp member is slidably attached to the strongback.

20. The mount defined in claim 18 further including a hand grip for squeezing together the strongback and the clamp member.

* * * * *